(12) United States Patent
Matsumura et al.

(10) Patent No.: US 12,079,051 B2
(45) Date of Patent: Sep. 3, 2024

(54) BATTERY HEAT BALANCING APPARATUS AND METHOD DURING PEAK MODE

(71) Applicant: Intel Corporation, Santa Clara, CA (US)

(72) Inventors: Naoki Matsumura, San Jose, CA (US); Tod F. Schiff, Portland, OR (US); Brian Fritz, Naples, FL (US); Chee Lim Nge, Beaverton, OR (US); Jorge Rodriguez, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 163 days.

(21) Appl. No.: 17/832,370

(22) Filed: Jun. 3, 2022

(65) Prior Publication Data

US 2022/0300051 A1    Sep. 22, 2022

Related U.S. Application Data

(63) Continuation-in-part of application No. 17/357,861, filed on Jun. 24, 2021, now Pat. No. 11,644,877.
(Continued)

(51) Int. Cl.
*G06F 1/20* (2006.01)
*G06F 1/26* (2006.01)
(Continued)

(52) U.S. Cl.
CPC .............. *G06F 1/206* (2013.01); *G06F 1/26* (2013.01); *H01M 10/617* (2015.04); *H01M 10/63* (2015.04); *H02J 7/0063* (2013.01)

(58) Field of Classification Search
CPC ........ G06F 1/206; G06F 1/26; H01M 10/617; H01M 10/63; H02J 7/0063
See application file for complete search history.

(56) References Cited

U.S. PATENT DOCUMENTS 5,783,998 A   7/1998  Nakajou et al.
6,459,175 B1  10/2002 Potega et al.
(Continued)

OTHER PUBLICATIONS

Notice of Allowance issued Jan. 10, 2023 for U.S. Appl. No. 17/357,861, 10 pages.
(Continued)

*Primary Examiner* — Aurel Prifti
(74) *Attorney, Agent, or Firm* — Schwabe, Williamson & Wyatt, P.C.

(57) ABSTRACT

Techniques are provided for operating a computing system in a peak power mode while avoiding increased degradation of a battery. The peak power mode include cycles with peak and off-peak currents. The amplitude and duration of the peak and off-peak currents are governed by a thermal/heat budget of the battery. A processor can read the battery information during usage and calculate one or more parameters which are derived from heat. If a parameter is smaller than a reference value, the processor can update the peak power parameters to provide an increase in peak current/power and/or duration. If a parameter is larger than the reference value, no heat budget is available to provide an increase in peak current/power and/or duration. The thermal/heat budget can be enforced over each cycle of the peak power mode or in a summation over multiple cycles.

25 Claims, 8 Drawing Sheets

Related U.S. Application Data which is a continuation of application No. 16/203,302, filed on Nov. 28, 2018, now Pat. No. 11,126,232.

(51) Int. Cl.
*H01M 10/617* (2014.01)
*H01M 10/63* (2014.01)
*H02J 7/00* (2006.01)

(56) References Cited

U.S. PATENT DOCUMENTS

| | | | |
|---|---|---|---|
| 6,785,829 B1 | 8/2004 | George et al. | |
| 7,570,025 B2 | 8/2009 | Kim | |
| 7,990,109 B2 | 8/2011 | White et al. | |
| 8,397,088 B1 | 3/2013 | Ghose | |
| 9,703,341 B1* | 7/2017 | Sultenfuss | H04B 5/24 |
| 10,162,401 B1* | 12/2018 | Brys | G01R 31/3842 |
| 10,175,734 B1* | 1/2019 | Bourgeault | G06F 1/26 |
| 10,884,475 B1* | 1/2021 | Wang | G06F 1/3296 |
| 2001/0001532 A1 | 5/2001 | Galbraith et al. | |
| 2002/0036481 A1 | 3/2002 | Nagase | |
| 2003/0057918 A1 | 3/2003 | Aoki et al. | |
| 2003/0188210 A1 | 10/2003 | Nakazato et al. | |
| 2004/0070371 A1 | 4/2004 | Chern et al. | |
| 2005/0146816 A1 | 7/2005 | Nguyen et al. | |
| 2005/0289375 A1 | 12/2005 | Ranganathan et al. | |
| 2008/0007224 A1 | 1/2008 | Melichar | |
| 2008/0058999 A1 | 3/2008 | Khodorkovsky et al. | |
| 2009/0037754 A1* | 2/2009 | Cha | G06F 1/206 |
| | | | 713/601 |
| 2009/0089602 A1 | 4/2009 | Bose et al. | |
| 2009/0147423 A1 | 6/2009 | Mulligan et al. | |
| 2009/0243549 A1 | 10/2009 | Matsumura et al. | |
| 2010/0000809 A1 | 1/2010 | Nishi et al. | |
| 2012/0001489 A1 | 1/2012 | Hermerding, II et al. | |
| 2012/0086368 A1 | 4/2012 | Kawabuchi et al. | |
| 2012/0139345 A1 | 6/2012 | Ye et al. | |
| 2013/0009463 A1 | 1/2013 | Iwasaki et al. | |
| 2013/0082660 A1 | 4/2013 | Plestid | |
| 2013/0227327 A1 | 8/2013 | Chun et al. | |
| 2013/0254579 A1 | 9/2013 | Derbyshire et al. | |
| 2014/0009131 A1 | 1/2014 | Shilimkar et al. | |
| 2014/0013098 A1 | 1/2014 | Yeung | |
| 2014/0067139 A1 | 3/2014 | Berke et al. | |
| 2014/0115363 A1 | 4/2014 | Tu et al. | |
| 2014/0325247 A1 | 10/2014 | Sodhi et al. | |
| 2014/0358288 A1 | 12/2014 | Huang | |
| 2015/0095666 A1* | 4/2015 | Ananthakrishnan | G06F 1/206 |
| | | | 713/300 |
| 2015/0119094 A1 | 4/2015 | Bartels et al. | |
| 2015/0130700 A1 | 5/2015 | Chen et al. | |
| 2015/0134981 A1 | 5/2015 | Nagato | |
| 2015/0249335 A1 | 9/2015 | Waheed et al. | |
| 2015/0340897 A1* | 11/2015 | Uan-Zo-Li | H02J 7/00036 |
| | | | 320/103 |
| 2015/0355698 A1 | 12/2015 | Luo et al. | |
| 2016/0179150 A1* | 6/2016 | Liu | G06F 1/329 |
| | | | 700/300 |
| 2016/0181830 A1 | 6/2016 | Matsumura et al. | |
| 2016/0299560 A1 | 10/2016 | Kondo | |
| 2016/0301226 A1 | 10/2016 | Matsumura et al. | |
| 2016/0320456 A1 | 11/2016 | Hawawini et al. | |
| 2016/0320827 A1 | 11/2016 | Ou Yang et al. | |
| 2016/0380455 A1 | 12/2016 | Greening et al. | |
| 2017/0038806 A1 | 2/2017 | Prajapati et al. | |
| 2017/0060213 A1 | 3/2017 | Wu et al. | |
| 2017/0092996 A1* | 3/2017 | Rodriguez | H02J 7/005 |
| 2017/0102751 A1 | 4/2017 | Zeng | |
| 2017/0117721 A1 | 4/2017 | Toya | |
| 2017/0179733 A1 | 6/2017 | Matsumura et al. | |
| 2017/0220445 A1 | 8/2017 | Cunningham et al. | |
| 2017/0222464 A1 | 8/2017 | Pullen et al. | |
| 2017/0255213 A1 | 9/2017 | Oikarinen | |
| 2017/0269652 A1 | 9/2017 | Lee et al. | |
| 2017/0293332 A1 | 10/2017 | Rotem et al. | |
| 2017/0353042 A1* | 12/2017 | Liu | H01M 10/4257 |
| 2018/0029483 A1* | 2/2018 | Del Core | B60L 50/40 |
| 2018/0141458 A1 | 5/2018 | Jammoul et al. | |
| 2018/0157315 A1 | 6/2018 | Ehsan et al. | |
| 2018/0219389 A1 | 8/2018 | Binder et al. | |
| 2018/0232032 A1 | 8/2018 | Wang et al. | |
| 2018/0284879 A1 | 10/2018 | Gorbatov et al. | |
| 2018/0324979 A1 | 11/2018 | North et al. | |
| 2018/0337536 A1 | 11/2018 | Li et al. | |
| 2019/0004593 A1* | 1/2019 | Gomi | G06F 1/3296 |
| 2019/0011969 A1 | 1/2019 | Atkinson et al. | |
| 2019/0036367 A1 | 1/2019 | Sultenfuss et al. | |
| 2019/0058336 A1 | 2/2019 | Thompson et al. | |
| 2019/0058352 A1 | 2/2019 | Gow et al. | |
| 2019/0115772 A1 | 4/2019 | Takeda et al. | |
| 2019/0190087 A1 | 6/2019 | Tsai et al. | |
| 2019/0250660 A1* | 8/2019 | Tanabe | H04W 52/0229 |
| 2019/0305684 A1 | 10/2019 | Sonntag | |
| 2020/0004306 A1 | 1/2020 | Uan-zo-li | |
| 2020/0058968 A1 | 2/2020 | Thompson et al. | |
| 2020/0371573 A1* | 11/2020 | Nagano | G09G 3/36 |

OTHER PUBLICATIONS

Non-Final Office Action issued Jun. 27, 2022 for U.S. Appl. No. 17/357,861, 34 pages.

Non-Final Office Action issued Jun. 22, 2020 for U.S. Appl. No. 16/203,302, 21 pages.

Final Office Action issued Jan. 19, 2021 for U.S. Appl. No. 16/203,302, 21 pages.

Notice of Allowance issued May 19, 2021 for U.S. Appl. No. 16/203,302, 8 pages.

* cited by examiner

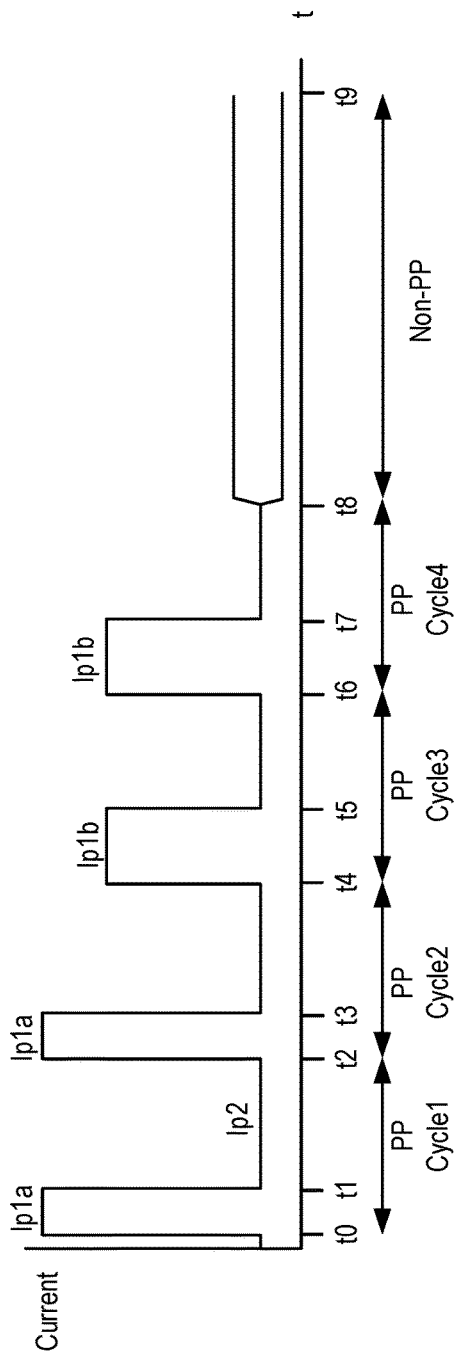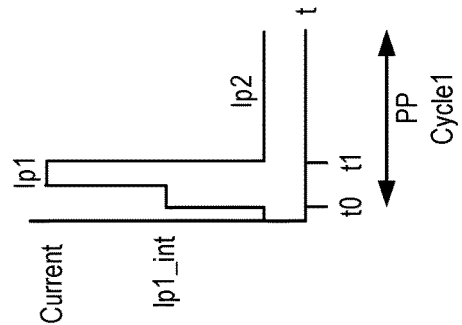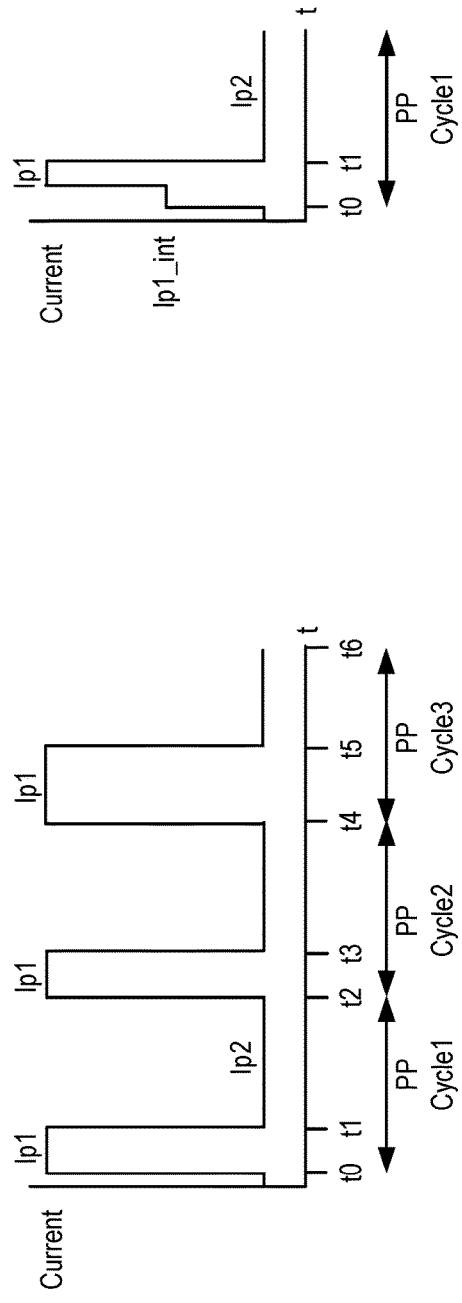

BATTERY HEAT BALANCING APPARATUS AND METHOD DURING PEAK MODE

PRIORITY CLAIM

This is a continuation-in-part of co-pending U.S. patent application Ser. No. 17/357,861, titled "Battery Heat Balancing During Peak Power Mode," filed Jun. 24, 2021, and published as US-2021-0318737 on Oct. 14, 2021, which in turn is a continuation of U.S. patent application Ser. No. 16/203,302, titled "Battery Heat Balancing During Peak Power Mode," filed Nov. 28, 2018, and issued as U.S. Pat. No. 11,126,232 on Sep. 21, 2021, both of which are incorporated herein by reference in their entirety.

FIELD

The present application generally relates to the field of batteries for computing systems and more particularly, to controlling the degradation of a battery.

BACKGROUND

A computing system such as a PC (personal computer) or a datacenter computer (for example, a server computing system) may enhance its performance by, instead of or in addition to receiving power from a power supply unit (PSU), extracting additional current from an attached battery (for example, a lithium ion or Li-ion battery). This enhancement of performance by extracting additional current from an attached battery can be referred to as peak power mode. Peak power mode can provide an ability to go to a high power. In some case, the computing system also receives AC power (for example, from a power supply unit). For example, the peak power mode may be implemented during times of peak power needs of the system.

However, in some cases, the high current used during peak power mode may damage the battery, and cycle life may be worse than a reference cycle life. This may cause system manufacturers to refrain from using high-performance peak power modes, leading to a degradation in system performance. This can deny users of the system from experiencing the full potential of the computing system.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 4C illustrates another battery current graph, with different duty cycles and different peak currents in the peak power mode, in accordance with some embodiments.

FIG. 4D illustrates another graph including battery voltage and current, with different duty cycles and a common peak current in the peak power mode, in accordance with some embodiments.

FIG. 4E illustrates another battery current graph, with a step up in peak current in the peak power mode, in accordance with some embodiments.

DETAILED DESCRIPTION

Figure 1:
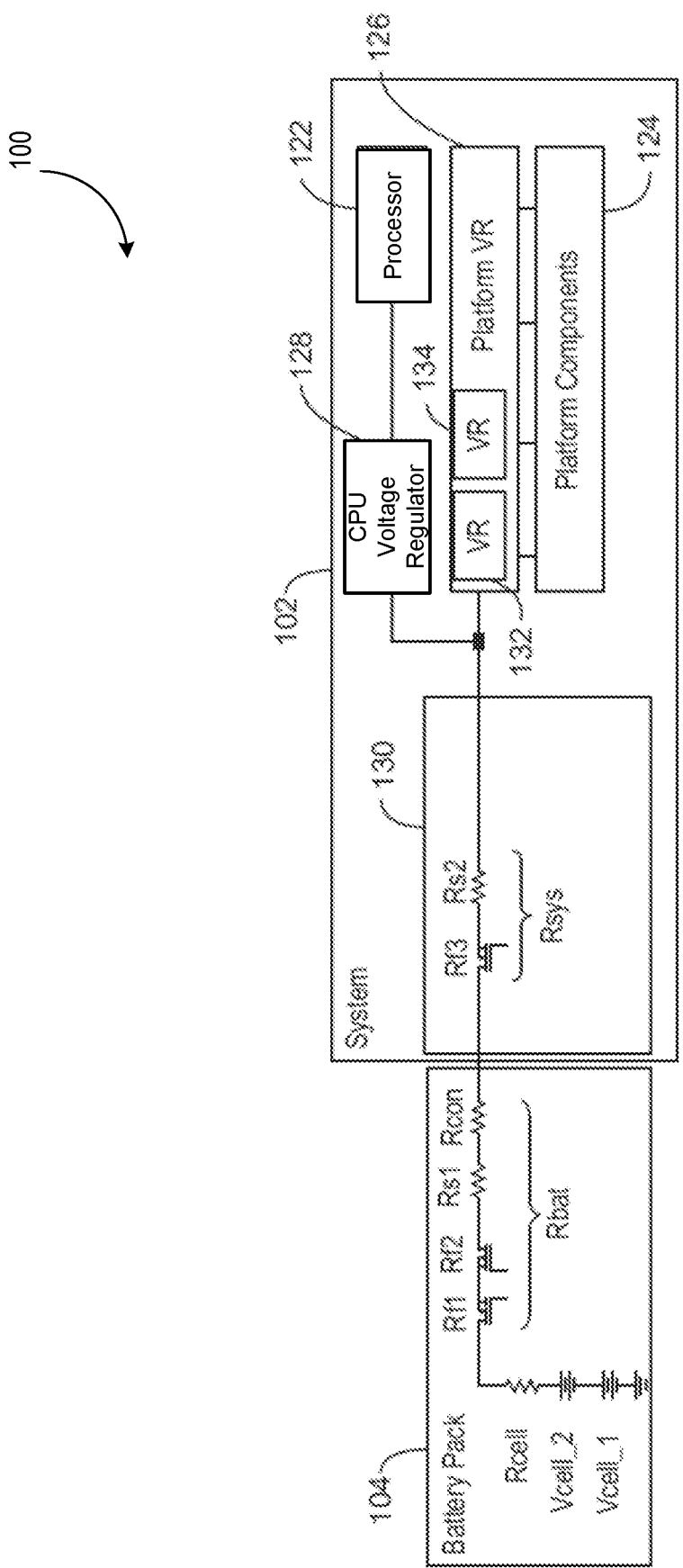
FIG. 1 illustrates a system in accordance with some embodiments.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

As mentioned at the outset, operating a computing system in a peak power mode can increase degradation of a battery. The techniques disclosed herein address this issue. In one aspect, the computing system operates in a peak power mode at some times and in a non-peak power mode, or normal/baseline mode, at other times. In the peak power mode, the battery is operated in cycles. In each cycle, the battery provides a peak current for a first period of time followed by an off-peak current for a second period of time. The first and second periods of time define a duty cycle of the battery. Moreover, the amplitude of the peak and off-peak currents and the respective time periods in which they are applied are governed by a thermal/heat budget of the battery. In the normal/baseline mode, the battery can supply a fixed current which is less than the peak current. The fixed current may be less than or greater than the off-peak current of the peak power mode. The peak power mode generally increases the performance of the computing system such as by allowing it to complete more tasks in a given amount of time.

The techniques disclosed herein establish a heat equation, e.g., Equation 1(b) further below, which maintains a heat from the battery over the time period under peak power mode to be the same as or less than (e.g., no greater than) a heat from the battery over the time period under a reference condition.

In a first aspect, when battery impedance is assumed to be the same for convenience's sake, impedances on the left side and the right side of Equation 1(b) are cancelled and the equation can be simplified as depicted in Equation 1(c). This equation considers the peak and off-peak currents and a reference current, without requiring a calculation of heat. This approach considers a balance of one or more parameters derived from heat or heat over a time period between peak/off-peak and a reference condition. This approach can also maintain one or more parameters derived from a heat from the battery over the time period under peak power mode to be the same as or less than (e.g., no greater than) one or more parameters derived from a heat from the battery over the time period under the reference condition.

Note considering the one or more parameters derived from heat is distinguished from considering heat itself. Similarly, maintain one or more parameters derived from heat is distinguished from maintaining heat itself.

The parameter may be, but is not limited to, $I^2t$ where I is current and t is duration of the current.

In a second aspect, the right hand side term of Equation 1(b) is a reference heat or thermal threshold. The right hand side term may be replaced with, but is not limited to, parameters derived from a reference heat/thermal threshold, parameters derived from activation energy of chemical reaction such as battery degradation reaction, and/or any threshold value regardless of heat. The value may adaptively change based on factors such as battery aging status and temperature.

This equation considers the peak and off-peak currents and the peak and off-peak resistance of the battery. The right hand side of the equation can be set to predetermined value so that it does not have to be calculated in real-time as the computer system is operating. This simplifies the implementation as a heat, which changes over time, would otherwise have to be considered.

In a third aspect, calculation and control of the parameters derived from heat may directly or indirectly use one or more of power, current, duration, battery impedance and/or impedance in power delivery. For example, the actual calculation and control may use System Turbo Power instead of Battery Turbo Current.

In a fourth aspect, a system and technique are provided that control a limit of peak current/power and/or duration by an equation that includes one or more of $P \times t$, $I^2 \times t$, $V \times I \times t$, P, $I^2 \times R$, $V \times I$ and/or I RMS (root mean square), where P is power, I is current, t is duration, V is voltage and R is resistance/impedance.

Some embodiments provide apparatus and method for dynamic battery power management. Some embodiments provide apparatus and method for peak power mode management. Some embodiments provide apparatus and method for battery heat balancing during peak power mode (for example, balancing of the surface heat of the battery). Some embodiments provide apparatus and method that consider one or more parameters (e.g., current and duration of the current) for heat balance in the battery (for example, surface heat of the battery) during peak power mode. Some embodiments provide apparatus and method for battery heat balancing during a peak power mode that includes peak power/current and off-peak power/current. Some embodiments provide apparatus and method for providing power from a battery to a system during peak power mode, and considering one or more parameters to heat balance in the battery during the peak power mode by providing peak power based on a reference condition heat of the battery over the time period (for example, based on a reference heat during a reference discharge mode). In some embodiments, peak power mode is enabled without additional degradation in the cycle life as compared with a reference condition. For example, some embodiments provide apparatus and method for extracting current from a battery during peak power mode without additional degradation in the battery cycle life as compared with a reference condition.

Various embodiments enable a peak power mode (also referred to as a turbo boost technology) that permits different power states (e.g., greater power over shorter time periods) without damaging the battery by considering a battery thermal budget and associated parameters. The package power control settings of power limits over time allow a designer to configure a high-performance technology (e.g., Intel Turbo Boost Technology 2.0) to match the platform power delivery and package thermal solution limitations. The baseline power refers to a threshold for average power that will not exceed Thermal Design Power (TDP). It is usually set to TDP power. This level is usually not set higher than thermal solution cooling limits. Turbo power can be considered to be a normal or baseline power level over a given period while shorter periods are elevated or boosted power levels.

In some embodiments, a control unit is provided which is configured to consider battery heat. The control unit may comprise logic adapted to: provide power from a battery to a system during a peak power mode that includes peak power and off-peak power; consider balance of one or more parameters derived from heat or heat over time period between the peak power and/or the off-peak power and a reference condition of the battery; and maintain the one or more parameters derived from the heat or the heat over time period under the peak power mode to be the same as or less (e.g., no greater than) than the one or more parameters derived from a heat from the battery over the time period under the reference condition of the battery. In some embodiments, the one or more parameters include $I^2t$, where I is current and t is a duration of the current. In some embodiments, the parameters may be, but not limited to, current, current-time product (e.g., $I^2t$, where I is current and t is duration of the current), P×t (where P is power), V×I×t (where V is voltage, I is current and t is duration of the current), P, I RMS and/or $I^2 \times R$ (where 'R' is the battery impedance). In some embodiments, calculation and control of the one or more parameters derived from heat directly or indirectly apply one or more of power, current, duration, battery temperature, battery impedance and/or impedance in power delivery.

In some embodiments, the logic of the control unit is adapted to maintain the one or more parameters derived from the heat or heat over time period from the battery over the time period under the peak power mode to be the same as or less than (e.g., no greater than) an allowable heat. In some embodiments, the logic of the control unit is adapted to provide peak current in steps including at least one peak current and at least one off-peak current. In some embodiments, the logic of the control unit is adapted to calculate available peak current and/or available peak power based on a battery thermal budget. In some embodiments, the logic of the control unit is adapted to provide peak current in steps including at least two different peak currents and at least two different off-peak currents. In some embodiments, the logic of the control unit is adapted to provide peak current in steps including at least two different peak currents.

The apparatus and method of various embodiments allows a computer system to use battery power in peak power modes without degrading the matter. Other technical effects will be evident from the various embodiments and figures.

Here, enhancement of performance by extracting current from an attached battery can be referred to as a peak power mode.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

FIG. 1 illustrates a system 100 in accordance with some embodiments. In some embodiments, the system 100 includes a power supply (for example, in some embodiments, a power supply unit). In some embodiments, system 100 includes a power supply system (for example, a stationary power supply system such as a PC or desktop power supply system, or such as a server power supply system). In some embodiments, the power supply unit (PSU) can convert AC power to low-voltage regulated DC power for the internal components of a system such as a computing system 102. In some embodiments, system 100 does not include a power supply unit and is powered only by battery power.

System 100 includes computing system 102 and a battery pack 104, e.g., comprising one or more batteries. Battery pack 104 can help provide power to system 102. In some embodiments, battery pack 104 can be a Li-ion battery pack. The battery pack can include voltage cells Vcell_1 and Vcell_2, a resistance Rcell, and other battery resistance Rbat. Battery resistance Rbat can include, for example, resistance Rs1, resistance Rcon, transistor resistance Rf1, transistor resistance Rf2, etc. In some embodiments, computing system 102 includes a processor 122 such as, for example, a central processing unit (CPU), platform components 124, platform voltage regulation (VR) 126, CPU voltage regulator 128, and system resistance 130. In some embodiments, platform VR 126 can include a number of voltage regulators such as, for example, voltage regulator (VR) 132 and voltage regulator (VR) 134. The CPU voltage regulator 128 can be, for example, technology that can dynamically adjust the voltage and/or current provided to the processor 122. The voltage adjustment can be based on processor activity to reduce processor power. It can allow for a higher clock frequency at a given power consumption, or lower power consumption at a given clock frequency, for example. In some embodiments, system resistance 130 (Rsys) can be illustrated by resistance Rs2 and/or transistor resistance Rf3. One example of system 102 is illustrated with reference to FIG. 7.

Referring back to FIG. 1, in some embodiments, any of the techniques (for example, dynamic battery power techniques) as described and/or illustrated herein (such as, for example, battery heat balancing during peak power mode) may be implemented using firmware in battery pack 104, power management within system 102, firmware and/or software in system 102, an operating system running on system 102, processor 122 (for example, executing stored instructions in storage of processor 122, executing stored instructions stored in other storage or memory of system 102, and/or firmware of processor 122, etc.), and/or some combination thereof. The techniques can be implemented in the processor, at the driver level, or in a discrete microcontroller.

Figure 2:
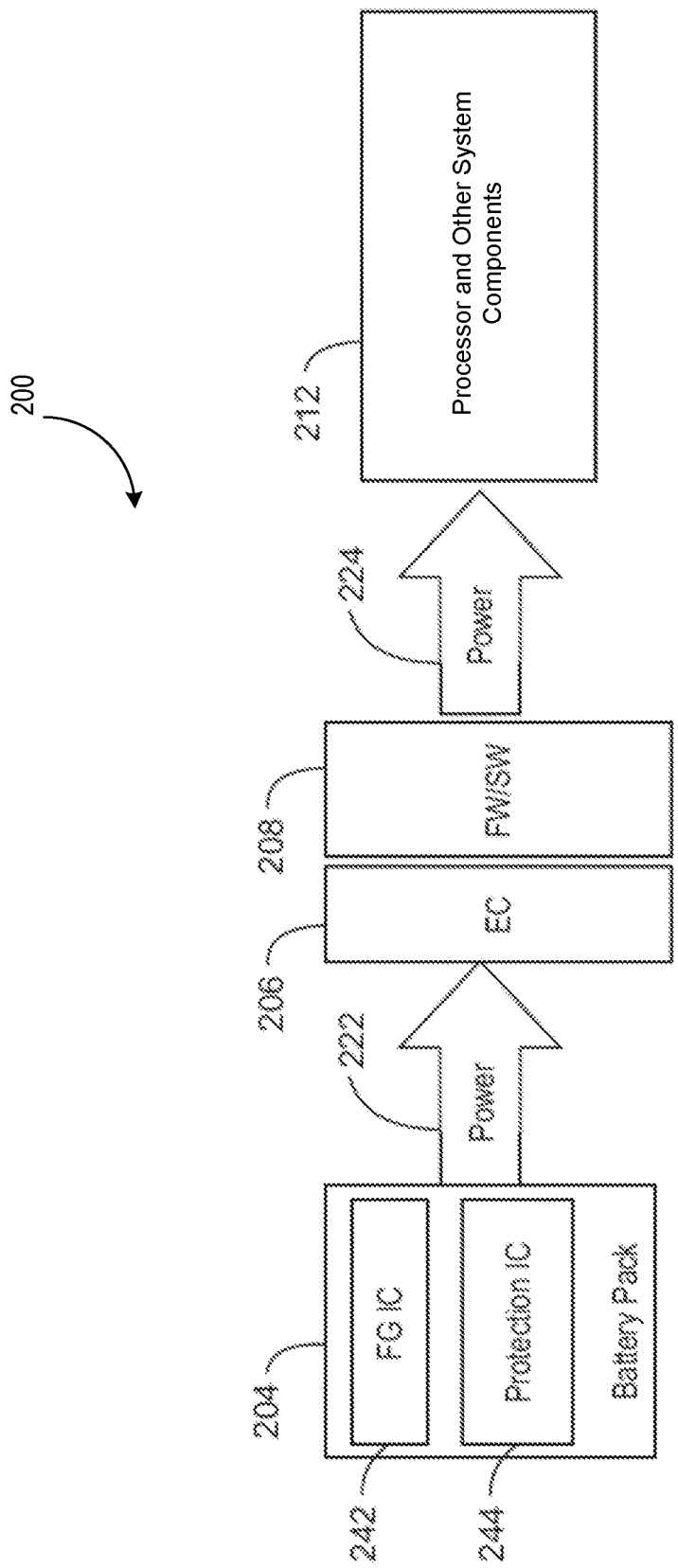
FIG. 2 illustrates a system in accordance with some embodiments.

FIG. 2 illustrates a system 200 in accordance with some embodiments. In some embodiments, system 200 includes a power supply (for example, in some embodiments, a power supply unit). In some embodiments, system 200 includes a power supply system (for example, a stationary power supply system such as a PC or desktop power supply system, or such as a server power supply system). In some embodiments, the power supply unit (PSU) can convert AC power to low-voltage regulated DC power for the internal components of a system such as a computing system. In some embodiments, system 200 does not include an AC power supply unit and is powered only by battery power.

In some embodiments, system 200 includes a battery pack 204, an embedded controller (EC) 206, firmware/software (FW/SW) 208, and a processor (e.g., a CPU) and other system components 212. In some embodiments, battery pack 104 can be a Li-ion battery pack. In some embodiments, battery pack 204 can be the same as or similar as battery pack 104. Battery pack 204 can provide power 222 (for example, including power communications and/or control) to EC 206 and/or FW/SW 208, which can provide power 224 (for example, including power communications and/or control) to the processor and other system components 212. In some embodiments, battery pack 204 can include a fuel gauge integrated circuit 242 (fuel gauge IC or FG IC) and a protection integrated circuit 244 (protection IC). In some embodiments, the other system components including in the processor and system components 212 can be, for example, a display, modem, and/or other system components, etc. In some embodiments, the processor and other components 212 can be included in a computing system such as, for example, computing system 102. In some embodiments, the embedded controller 206 and the firmware/software 208 can be provided in a battery pack (for example, in a battery back such as battery pack 204 and/or battery pack 104). In some embodiments, the embedded controller 206 and the firmware/software 208 can be included in a same computing system as the processor and other components 212, and/or in computing system 102. In some embodiments, embedded controller 206 and/or firmware/software 208 can help implement battery heat balancing during peak power mode according to techniques as described and/or illustrated anywhere herein.

In some embodiments, any of the techniques (for example, dynamic battery power techniques) as described and/or illustrated herein (such as, for example, battery heat balancing during peak power mode) may be implemented using firmware in battery pack 204, fuel gauge IC 242, protection IC 244, embedded controller 206, firmware/software 208, power management within the processor and other system components 212, firmware and/or software in the processor and other system components 212, an operating system running on the processor and other system components 212, a CPU/processor of the processor and other system components 212 (for example, executing stored instructions in storage of the processor), executing stored instructions stored in other storage or memory within the processor and other system components 212, and/or firmware of the processor within the processor and other system components 212, etc.), and/or some combination thereof.

Figure 3:
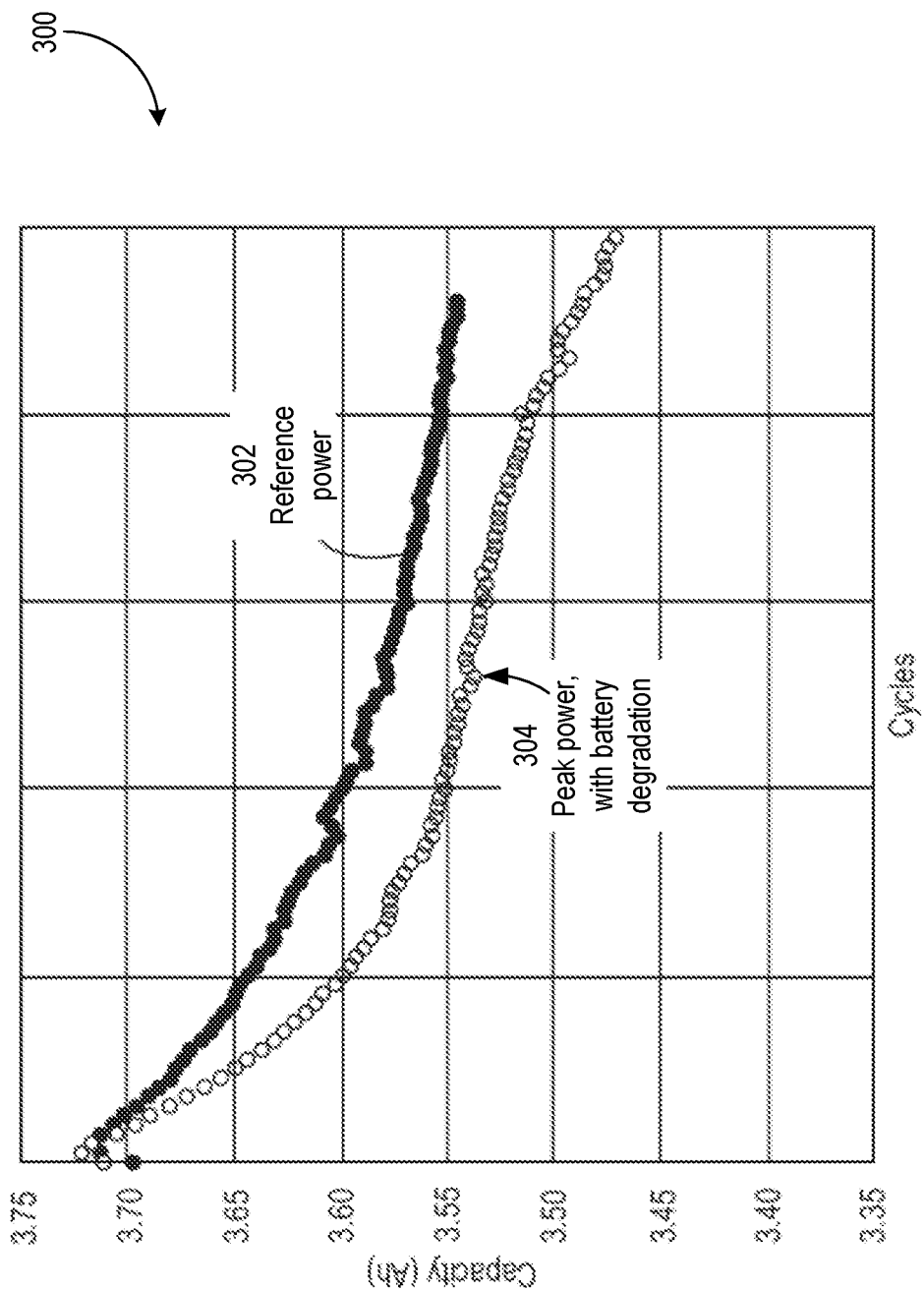
FIG. 3 illustrates a graph of cycle test results under reference and peak power mode conditions.

FIG. 3 illustrates graph 300 of cycle test results under reference and peak power mode conditions. The x-axis depicts cycles and the y-axis depicts battery capacity in ampere-hours (Ah). Graph 300 includes a reference power condition graph 302 and a peak power mode condition graph 304. In some embodiments, graph 300 illustrates battery capacity over time during reference discharge conditions (graph 302) and during a peak power mode (graph 304).

As discussed above, a computing system such as a PC (personal computer) or a datacenter computer (for example, a server computing system) may enhance its performance by extracting additional current from an attached battery in a peak power mode. For example, peak power mode may be implemented during times of peak power needs of the system, such as when a CPU has a larger number of tasks to execute quickly.

However, in some cases, the high current used during peak power mode may damage the battery, and cycle life may be worse than a reference cycle life. This may cause system manufacturers to refrain from using high-performance peak power modes, leading to a degradation in system performance. This can deny users of the system from experiencing the full potential of the computing system.

Repeated and uncontrolled use of peak currents can reduce the service life of a battery. For example, cycle test conditions of reference power 302 and peak power mode 304 may be defined as follows, resulting in graph 300, which illustrates that peak power mode 304 can provide worse cycle life than reference mode 302, even though average current during the reference condition and the peak power mode is the same.

For example, in some embodiments, the reference cycle life condition graph 302 illustrated in FIG. 3 can be based on a charge of 1C constant charge (CC), followed by 4.4 V constant voltage (CV) until 0.05C cutoff, and discharge of 1C until 3.0V cutoff. 1C is a reference level of charge/current. The peak power mode cycle life condition graph 304 illustrated in FIG. 3 can be based on a charge that is the same as defined above for the reference cycle life condition, and a discharge of 2.5C for 10 seconds (peak) followed by 0.3C for 21 seconds (it is noted that this equals 1.0C on average), and repeating the 2.5C and 0.3C discharge until the voltage hits 3.0 V and then 1C discharge until 3.0 V cutoff. FIG. 3 illustrates the reduction in cycle life using a peak power mode can reduce the serviceable life perceived by the user. However, in accordance with some embodiments, peak power mode can be enabled without additional cycle life degradation (for example, without additional cycle life degradation perceived by a user) as compared to the reference condition.

In accordance with some embodiments, heat balance in a battery (for example, surface heat of the battery) can be considered during the peak power mode. A current and duration of peak power and/or off-peak power can be defined so that heat from the battery (for example, battery surface heat) per a particular time period is similar to the reference condition.

This can be defined by Equation 1, as follows:

$$H(\text{peak power}) = H(\text{ref}) \tag{1}$$

where H(peak power) is heat from a battery (for example, battery surface heat) over a specific time period under peak power mode, and where H(ref) is heat from the battery (for example, battery surface heat) over a specific time period under a reference condition (for example, is a heat from the battery during a reference discharge mode).

Equation (1) can also be expressed as:

$$H(\text{peak power}) = \times \Sigma(I_{p1}^2 \times R_{p1} \times t_{on}) + \Sigma(I_{p2}^2 \times R_{p2} \times t_{off}) \tag{1(a)}$$

$$H(\text{ref}) = \Sigma[I_{r1}^2 \times R_{r1} \times (t_{on} + t_{off})] \tag{1(a')}$$

Where H is heat, $I_{p1}$ is peak current, $R_{p1}$, is battery impedance during peak current, $t_{on}$ is duration of peak current, $I_{p2}$ is off-peak current, $R_{p2}$ is battery impedance during off-peak current, $t_{off}$ is duration of off-peak current, $I_{r1}$ is current under a reference condition, e.g., a reference current, and $R_{r1}$ is battery impedance under reference condition.

In some embodiments, peak power mode can be implemented according to any of the exemplary techniques described and/or illustrated herein. In some embodiments, heat balance in a battery is considered during peak power mode, and current and duration of peak power and/or off-peak power are defined so that heat from the battery per time period is the same as (or similar to) the reference condition (for example, in accordance with Equation 1). In some embodiments, a current and duration of peak power and/or off-peak power can be defined so that heat from the battery per a particular time period during a particular time period under the peak power mode does not exceed (or is less than or equal to) heat from the battery during a particular time period under the reference condition. That is, in some embodiments, heat balance in a battery is considered during peak power mode, and current and duration of peak power and/or off-peak power are defined so that heat from the battery per time period does not exceed the reference condition (or is less than or equal to heat during the reference condition), for example, in accordance with Equation 2, as follows:

$$H(\text{peak power}) \leq H(\text{ref}) \quad (2)$$

Figure 4A:
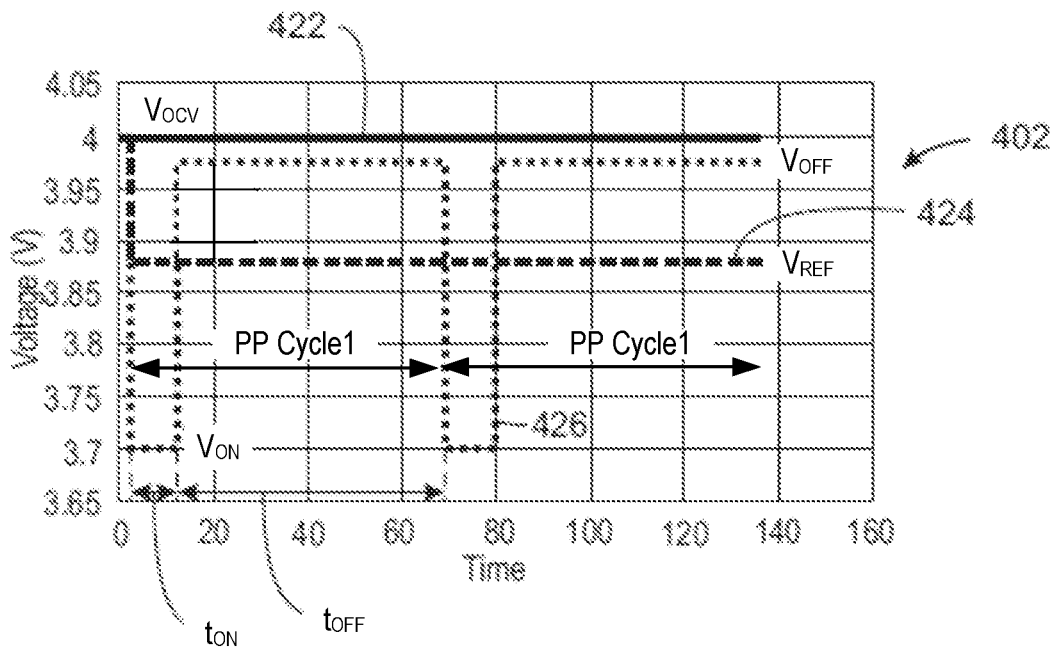
FIG. 4A illustrates a battery voltage graph 402 in a peak power mode, in accordance with some embodiments.
Figure 4B:
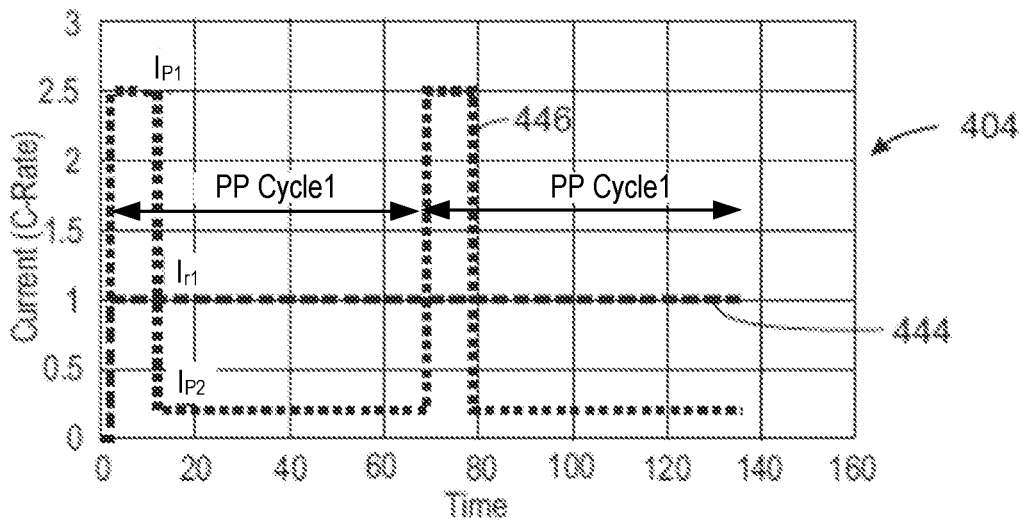
FIG. 4B illustrates a battery current graph 404 in a peak power mode, consistent with FIG. 4A, in accordance with some embodiments.

FIG. 4A illustrates a battery voltage graph 402 in a peak power mode, in accordance with some embodiments. FIG. 4B illustrates a battery current graph 404 in a peak power mode, consistent with FIG. 4A, in accordance with some embodiments.

For the graph 402, the x-axis depicts time in seconds and the y axis depicts Voltage (V). For the graph 404, the x-axis depicts time in seconds and the y-axis depicts Current as a C-rate, which is a normalized charge/current. For example, battery voltage and current are shown in accordance with some embodiments under reference condition and under peak power mode. The battery voltage graph 402 includes an open circuit voltage ($V_{OCV}$) 422, a voltage under the reference condition ($V_{ref}$) 424, and a voltage 426 under a peak power mode. $V_{OCV} > V_{OFF} > V_{REF}$. Current 404 includes a current under the reference condition ($I_{r1}$) 444 and a current 446 under the peak power mode.

The peak power (PP) mode can include successive peak power cycles including PP Cycle1 and PP Cycle2. For example, PP Cycle1 extends from about 1-70 seconds and PP Cycle2 extends from about 71-140 seconds. Each PP cycle has the same duration, in one possible approach. Each PP cycle includes a time period ($t_{ON}$) in which a peak current/power is applied and a period ($t_{OFF}$) in which a non-peak current/power is applied. For example, in PP Cycle1, $t_{ON}$ is from about 1-10 sec. and $t_{OFF}$ is from about 11-70 sec. In PP Cycle2, $t_{ON}$ is from about 71-80 sec. and $t_{OFF}$ is from about 18-140 sec.

H(peak power), which is heat under peak power mode, can be calculated according to Equation 3, as follows:

$$H(\text{peak power})=(V_{OCV}-V_{ON}) \times I_{p1} \times t_{ON}+(V_{OCV}-V_{OFF}) \times I_{p2} \times t_{OFF} \quad (3)$$

where $V_{OCV}$ is an open circuit voltage, $I_{p1}$ is a peak current, $V_{ON}$ is a battery voltage during peak current $I_{p1}$, $t_{ON}$ is a duration of peak current, $I_{p2}$ is an off-peak current, $V_{OFF}$ is a battery voltage during off-peak current $I_{p2}$, and $t_{OFF}$ is a duration of the off-peak current.

Since $V_{OCV}-V_{ON}$ is equal to $I_{p1} \times R_{p1}$ (where $R_{p1}$ is battery impedance during peak current), and since $V_{OCV}-V_{OFF}$ is equal to $I_{p2} \times R_{p2}$ (where $R_{p2}$ is battery impedance during off-peak current), H(peak power) can be described according to Equation 4, as follows:

$$H(\text{peak power})=I_{p1}^2 \times R_{p1} \times t_{ON}+I_{p2}^2 \times R_{p2} \times t_{OFF} \quad (4)$$

H(ref) (heat under reference condition) can be calculated according to Equation 5, as follows:

$$H(\text{ref})=(V_{OCV}-V_{REF}) \times I_{r1} \times (t_{ON}+t_{OFF}) \quad (5)$$

where $I_{r1}$ is current under reference condition, and $V_{REF}$ is battery voltage during current $I_{r1}$ under reference condition.

Since $V_{OCV}-V_{REF}$ equals $I_{r1} \times R_{r1}$ (where $R_{r1}$ is battery impedance under reference condition), H(ref) can also be described according to Equation 6, as follows:

$$H(\text{ref})=I_{r1}^2 \times R_{r1} \times (t_{ON}+t_{OFF}) \quad (6)$$

In accordance with some embodiments, current and/or duration of peak power mode may be defined so that the following three Equations 1, 4 and 6 are established to result in Equation 7 as follows:

$$H(\text{peak power})=H(\text{ref}) \quad (1)$$

$$H(\text{peak power})=I_{p1}^2 \times R_{p1} \times t_{ON}+I_{p2}^2 \times R_{p2} \times t_{OFF} \quad (4)$$

$$H(\text{ref})=I_{r1}^2 \times R_{r1} \times (t_{ON}+t_{OFF}) \quad (6)$$

$$I_{p1}^2 \times R_{p1} \times t_{ON}+I_{p2}^2 \times R_{p2} \times t_{OFF}=I_{r1}^2 \times R_{r1} \times (t_{ON}+t_{OFF}) \quad (7)$$

When $R_{p1}=R_{p2}=R_{r1}$ for example, Equation 7 can be reduced to result in Equation 8, as follows:

$$I_{p1}^2 \times t_{ON}+I_{p2}^2 \times t_{OFF}=I_{r1}^2 \times (t_{ON}+t_{OFF}) \quad (8)$$

Five parameters remain in Equation 8, including $I_{r1}$, $I_{p1}$, $t_{ON}$, $I_{p2}$, and $t_{OFF}$. In some embodiments, four of these five parameters can be defined (for example, by a user). Once four of the parameters are defined, the fifth parameter can then be determined to maintain heat balancing in accordance with some embodiments. In some embodiments, if less than four parameters are defined, possible solutions for two or more parameters may be determined.

For example, when $I_{r1}$ is 1C, $I_{p1}$ is 2.5C, $t_{ON}$ is 10 seconds, and $I_{p2}$ is 0.3C, $t_{OFF}$ can be calculated using Equation 8 as approximately 57 seconds (or approximately 57.7 seconds). In this manner, cycle life under peak power mode can be similar to (and/or better than) cycle life of the reference condition (1C) in accordance with some embodiments.

It is noted that in some embodiments in which current and duration of peak power and/or off-peak power can be defined so that heat from the battery per a particular time period during a particular time period under the peak power mode does not exceed (or is less than or equal to) heat from the battery during a particular time period under the reference condition (for example, some embodiments implementing Equation 2), Equation 7 and Equation 8 can be implemented, as follows:

$$I_{p1}^2 \times R_{p1} \times t_{ON}+I_{p2}^2 \times R_{p2} \times t_{OFF} \leq I_{r1}^2 \times R_{r1} \times (t_{ON}+t_{OFF}) \quad (9)$$

$$I_{p1}^2 \times t_{ON}+I_{p2}^2 \times t_{OFF} \leq I_{r1}^2 \times (t_{ON}+t_{OFF}) \quad (10)$$

Five parameters remain in Equation 10, including $I_{r1}$, $I_{p1}$, $t_{ON}$, $I_{p2}$, and $t_{OFF}$. In some embodiments, four of these five parameters can be defined (for example, by a user). Once four of the parameters are defined, the fifth parameter can then be determined to maintain heat balancing in accordance with some embodiments. In some embodiments, if less than four parameters are defined, possible solutions for two or more parameters may be determined.

For example, when $I_{r1}$ is 1C, $I_{p1}$ is 2.5C, $t_{ON}$ is 10 seconds, and $I_{p2}$ is 0.3C, $t_{OFF}$ can be calculated using Equation 10 as being greater than or equal to approximately 57 seconds (or greater than or equal to approximately 57.7 seconds). In this manner, cycle life under peak power mode can be similar to (and/or better than) cycle life of the reference condition (1C) in accordance with some embodiments.

In some embodiments, a controller or control unit (for example, a processor) can be used to limit peak power levels during peak power mode events (or turbo events). In some embodiments, the peak power levels can be limited in accordance with any of the techniques and/or Equations illustrated and/or discussed herein.

Although FIG. 4B illustrates using two currents $I_{p1}$ and $I_{p2}$ at two levels, it is noted that in some embodiments, more than two currents at more than two levels may be implemented. In some embodiments, for example, more than two different currents (for example, more than two different peak power mode currents) may be implemented while considering battery heat balance (for example, by balancing battery heat relative to a reference condition). The various levels of peak power current may be implemented based on needs for peak power (for example, based on processor needs for peak power). Some embodiments may include more than one peak current levels and/or one or more off-peak current levels, for example, and can include different time durations for each of the currents. In some embodiments, a processor may be slowed down in order to avoid damage to the battery in accordance with techniques described herein (for example, using battery heat balancing).

FIG. 4C illustrates another battery current graph, with different duty cycles and different peak currents in the peak power mode, in accordance with some embodiments. In FIG. 4C-4E, the x-axis depicts time and the y-axis depicts current. This example includes four successive peak power (PP) cycles, PP Cycles1-4 followed by a Non-PP time period. Each PP cycle includes a first time period ($t_{ON}$) in which a peak current is provided by the battery and a second time period ($t_{OFF}$) in which an off-peak current is provided by the battery. The peak current is provided before the non-peak current in each cycle, in this example. In another example, the peak current is provided after the non-peak current in each cycle. Each PP cycle has a common duration in this example.

For example, PP Cycle1 has a first time period t0-t1 in which the peak current Ip1a is provided and a second time period t1-t2 in which the off-peak current Ip2 is provided. PP Cycle2 has a first time period t2-t3 in which the peak current Ip1a is provided and a second time period t3-t4 in which the off-peak current Ip2 is provided. In these two cycles, the peak current is the same and the first time period is the same. However, subsequently the peak currents and their first time periods change. Specifically, in PP Cycle3, the first time period t4-t5 is longer than t0-t1 and t2-t3. However, the peak current Ip1b is less than Ip1a. Also, the second time period t5-t6 is shorter than t1-t2 and t3-t4. The duty cycle in PP Cycle3 is greater than in PP Cycle1 and PP Cycle2. PP Cycle4 is similar to PP Cycle3. PP Cycle4 has a first time period t6-t7 in which the peak current Ip1b is provided and a second time period t7-t8 in which the off-peak current Ip2 is provided. By providing a lower peak current for a longer time, the processor which is powered by the battery can perform the same or a similar number of tasks in the peak power mode.

Figure 5:
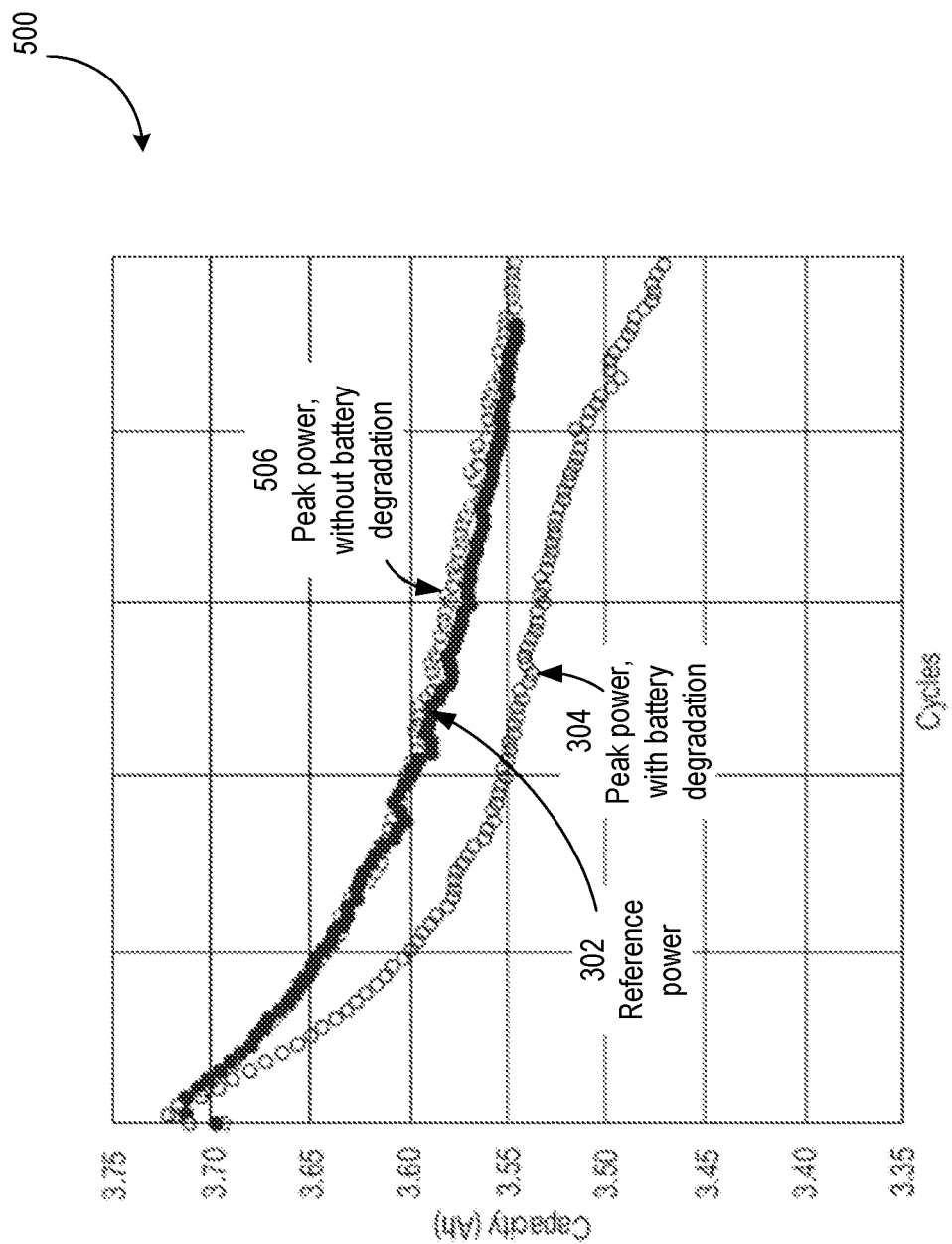
FIG. 5 illustrates a graph of cycle test results under reference and peak power mode conditions.

In one implementation, the left hand side of Equation 1(b) or 1(c), discussed further below in connection with FIG. 5, is the same in each PP cycle. Essentially, the increase in $t_{ON}$ is compensated for by the decrease in peak current. Equation 1(b) or 1(c) are enforced in each PP cycle, in this example. For example, in PP Cycle1, Equation 1(b) can be written as:

$$(I_{p1a}^2 \times R_{p1} \times (t1-t0)) + (I_{p2}^2 \times R_{p2} \times (t2-t1)) \leq (I_{r1}^2 \times R_{r1} \times ((t1-t0)+(t2-t1))).$$

Equation 1(c) can be written as:

$$(I_{p1a}^2 \times (t1-t0)) + (I_{p2}^2 \times (t2-t1)) \leq (I_{r1}^2 \times ((t1-t0)+(t2-t1))).$$

After PP Cycle4, the current in the non-PP period can continue at a relatively low level which may be greater than, equal to, or lower than Ip2. The processor may enter the non-PP period when it is idle or has a relatively low workload, or otherwise does not need to invoke the peak power mode.

FIG. 4D illustrates another graph including battery current, with different duty cycles and a common peak current in the peak power mode, in accordance with some embodiments. PP Cycle1 has a first time period t0-t1 in which Ip1 is provided, and a second time period t1-t2 in which Ip2 is provided. PP Cycle2 has a first time period t2-t3 in which Ip1 is provided, and a second time period t3-t4 in which Ip2 is provided. PP Cycle3 has a first time period t4-t5 in which Ip1 is provided, where the first time period is greater than in the first two PP cycles, but the peak current is the same as in the first two PP cycles, and a second time period t5-t6 in which Ip2 is provided, where the second time period is shorter than in the first two PP cycles.

In this example, the duty cycle changes while the peak power cycle duration remains fixed. The left hand side of Equation 1(b) or 1(c) is therefore different in PP Cycle3 compared to PP Cycle1 and PP Cycle2. Equation 1(b) or 1(c) can be enforced over a set of PP cycles, e.g., PP Cycle1-PP Cycle3, in this example. For example, the left hand side of Equation 1(b) can be written as:

$$(I_{p1}^2 \times R_{p1} \times (t1-t0)) + (I_{p2}^2 \times R_{p2} \times (t2-t1)) + (I_{p1}^2 \times R_{p1} \times (t3-t2)) + (I_{p2}^2 \times R_{p2} \times (t4-t3)) + (I_{p1}^2 \times R_{p1} \times (t5-t4)) + (I_{p2}^2 \times R_{p2} \times (t6-t5)).$$

The right hand side of Equation 1(b) can be written as:

$$(I_{r1}^2 \times R_{r1} \times ((t1-t0)+(t2-t1))) + (I_{r1}^2 \times R_{r1}((t3-t2)+(t4-t3))) + (I_{r1}^2 \times R_{r1} \times ((t5-t4)+(t6-t5))).$$

Similarly, the left hand side of Equation 1(c) can be written as:

$$(I_{p1}^2 \times (t1-t0)) + (I_{p2}^2 \times (t2-t1)) + (I_{p1}^2 \times (t3-t2)) + (I_{p2}^2 \times (t4-t3)) + (I_{p1}^2 \times (t5-t4)) + (I_{p2}^2 \times (t6-t5)).$$

The right hand side of Equation 1(c) can be written as:

$$(I_{r1}^2 \times ((t1-t0)+(t2-t1))) + (I_{r1}^2 \times ((t3-t2)+(t4-t3))) + (I_{r1}^2 \times ((t5-t4)+(t6-t5))).$$

FIG. 4E illustrates another battery current graph, with a step up in peak current in the peak power mode, in accordance with some embodiments. In some embodiments, peak current may be implemented in multiple steps. This example shows two steps. The peak current is increased to an intermediate level, Ip1_int, in a first step, starting at t0, and from Ip1_int to the final peak level, Ip1, in a second step, starting at a midpoint between t0 and t1, for example.

Many different step variations may be implemented in accordance with some embodiments. For example, peak 1 (Ip1_int)→peak 2 (Ip1)→off-peak (Ip2)→peak 1→off-peak→peak 2→off-peak, etc. Although examples have been illustrated and described herein, many different step variations (and/or variations between different steps) may be implemented in accordance with some embodiments. In one approach, the number of steps is set as a parameter of the peak power mode. The configuration of the steps including the amplitude and duration can also be set. It is also possible to provide the off-peak current in steps.

FIG. 5 illustrates graph 500 of cycle test results under reference and peak power mode conditions. The x-axis depicts cycles and the y-axis depicts battery capacity in ampere-hours (Ah). Graph 500 includes the reference power condition graph 302 of FIG. 3, the peak power mode condition graph 304 of FIG. 3, and a peak power mode condition graph 506, which represents a peak power mode without battery degradation, in contrast to the graph 302. In some embodiments, graph 500 illustrates battery capacity over time during reference discharge conditions (graph 302), during a first peak power mode (graph 304), and during a second peak power mode (graph 506). As discussed herein, repeated and uncontrolled use of peak currents can reduce the service life of a battery. For example, cycle test conditions of reference power 302 and peak power mode 304 may be defined as follows, resulting in graph 500, which illustrates that peak power mode 304 can provide a worse cycle life than the reference mode of graph 302, even though average current during the reference condition and the peak power mode is the same.

For example, in some embodiments, the reference cycle life condition graph 302 illustrated in FIG. 5 can be based on a charge of 1C constant charge (CC), followed by 4.4V constant voltage (CV) until 0.05C cutoff, and discharge of 1C until 3.0V cutoff. The peak power mode cycle life condition graph 304 illustrated in FIG. 5 can be based on a charge that is the same as defined above for the reference cycle life condition, and discharge of 2.5C for 10 seconds (peak) followed by 0.3C for 21 seconds (it is noted that this equals 1.0C on average), and repeating the 2.5C and 0.3C discharge until the voltage hits 3.0V and then 1C discharge until 3.0V cutoff.

FIG. 5 illustrates the reduction in cycle life using a peak power mode as illustrated by graph 304 can reduce the serviceable life perceived by the user. However, in accordance with some embodiments, peak power mode can be enabled without additional cycle life degradation (for example, without additional cycle life degradation perceived by a user) as compared to the reference condition. In accordance with some embodiments, heat balance in a battery can be considered during peak power mode. A current and duration of peak power and/or off-peak power can be defined so that heat from the battery per a particular time period is similar to the reference condition. For example, the peak power mode cycle life condition graph 506 can be based on using techniques described herein of maintaining heat from the battery during peak power and/or off-peak power being similar to that of the reference condition (for example, using Equation 8 as described herein). For example, peak power mode cycle life condition graph 506 illustrated in FIG. 5 can be based on a charge that is the same as defined above for the reference cycle life condition, and discharge of 2.5C for 10 seconds (peak) followed by 0.3C for 57 seconds, and repeating the 2.5C and 0.3C discharge until the voltage hits 3.0V and then 1C discharge until 3.0V cutoff. In this manner, in accordance with some embodiments, peak power mode can be enabled as illustrated by graph 506 without additional cycle life degradation (for example, without additional cycle life degradation perceived by a user) as compared to the reference condition. In fact, in some embodiments, cycle life degradation may actually be slightly improved.

The foregoing examples of peak power mode may be used in accordance with some embodiments, but it is noted that some actual embodiments may be different. For example, in some embodiments, peak power pulses may be both aperiodic and of variable magnitude.

Equation 1(a) and 1(a') can also be expressed through equation (2) as:

$$\Sigma(I_{p1}^2 \times R_{p1} \times t_{on}) + \Sigma(I_{p2}^2 \times R_{p2} \times t_{off}) \leq \Sigma(I_{r1}^2 \times R_{r1} \times (t_{on} + t_{off})) \quad 1(b)$$

where, $I_{r1}$ is the reference current and $R_{r1}$ is the reference impedance. The left hand side of the equation is a first value which is maintained to be less than, or no greater than, the right hand side of the equation, which is a second value.

The right hand side term of equation 1(b), which is a reference heat, may be replaced with a predetermined reference value, Value_ref, e.g., based on parameters derived from a reference heat/thermal threshold, parameters derived from activation energy of chemical reaction such as battery degradation reaction, and/or any threshold value regardless of heat. The value may adaptively change based on factors such as battery aging status and temperature. In this case we have:

$$\Sigma(I_{p1}^2 \times R_{p1} \times t_{on}) + \Sigma(I_{p2}^2 \times R_{p2} \times t_{off}) \leq \text{Value\_ref} \quad 1(b')$$

Although battery impedance can changes in practice as a function of temperature, current, history, aging, etc., battery impedance may be same in some conditions, or may be assumed to be the same, as a simplification. In this case, the impedances on the left side and the right side of equation 1(b) are cancelled and equation 1(b) can be simplified as follows:

$$\Sigma(I_{p1}^2 \times t_{on}) + \Sigma(I_{p2}^2 \times t_{off}) \leq \Sigma(I_{r1}^2 \times (t_{on} + t_{off})) \quad 1(c)$$

As above, the left hand side of the equation is a first value which is maintained to be less than, or no greater than, the right hand side of the equation, which is a second value. Note, in equation 1(c) the left side and the right side are not battery heat anymore. So, peak power mode can be implemented using the condition of equation 1(c), in accordance with some embodiments. In one such embodiment, a control unit is configured to consider battery heat, wherein the control unit adapted to provide power from a battery to a system during a peak power mode that includes peak power and off-peak power; and consider balance of one or more parameters derived from heat or heat over time period between peak and/or off-peak and reference condition. The control unit is further configured to maintain the one or more parameters derived from heat or heat over time period under peak power mode to be the same as or less than a heat from the battery over the time period under the reference condition. In some embodiments, the one or more parameters include $I^2 t$, where I is current and t is a duration of the current.

The right side of equation 1(b) is a reference heat or thermal threshold. In some embodiments, the right side of equation 1(b) can be replaced with, but not limited to, one or more parameters derived from a reference heat and/or thermal threshold, one or more parameters derived from activation energy of chemical reaction such as battery degradation reaction, and/or any threshold value regardless of heat. The threshold value may adaptively change by battery aging status, temperature, etc. As such, a reference other than heat can be used for implementing heat power mode.

The summation term in Equations 1(b) and 1(c) indicate that the equations can be enforced over one or more peak power cycles. See, e.g., FIGS. 4C and 4D for examples.

The right hand side term of equation 1(c) may be replaced with a predetermined reference value, Value_ref. In this case we have:

$$\Sigma(I_{p1}^2 \times t_{on}) + \Sigma(I_{p2}^2 \times t_{off}) \leq \text{Value\_ref} \quad 1(c')$$

In some embodiments, calculation and control of the one or more parameters derived from heat directly use one or more of power, current, duration, battery impedance and/or impedance in power delivery. For example, actual calculation and control may use System Turbo Power instead of Battery Turbo Current. System Turbo Power can be obtained via voltage regulator controller or firmware in a power management unit. This firmware is a very low-level code that is machine-independent and enables a compiled file to run on different types of processors. In some embodiments, the control unit is adapted to maintain the one or more parameters derived from heat or heat over time period from the battery over the time period under peak power mode to be the same as or less than an allowable heat. In some embodiments, a system controls a limit of peak current, power, and/or duration by equation 2, 1(b) or 1(c) using one or more of: P×t, I²×t, V×I×t, P, I²×R, V×I and/or I RMS, where P is power, I is current, t is duration, V is voltage and R is resistance.

Figure 6:
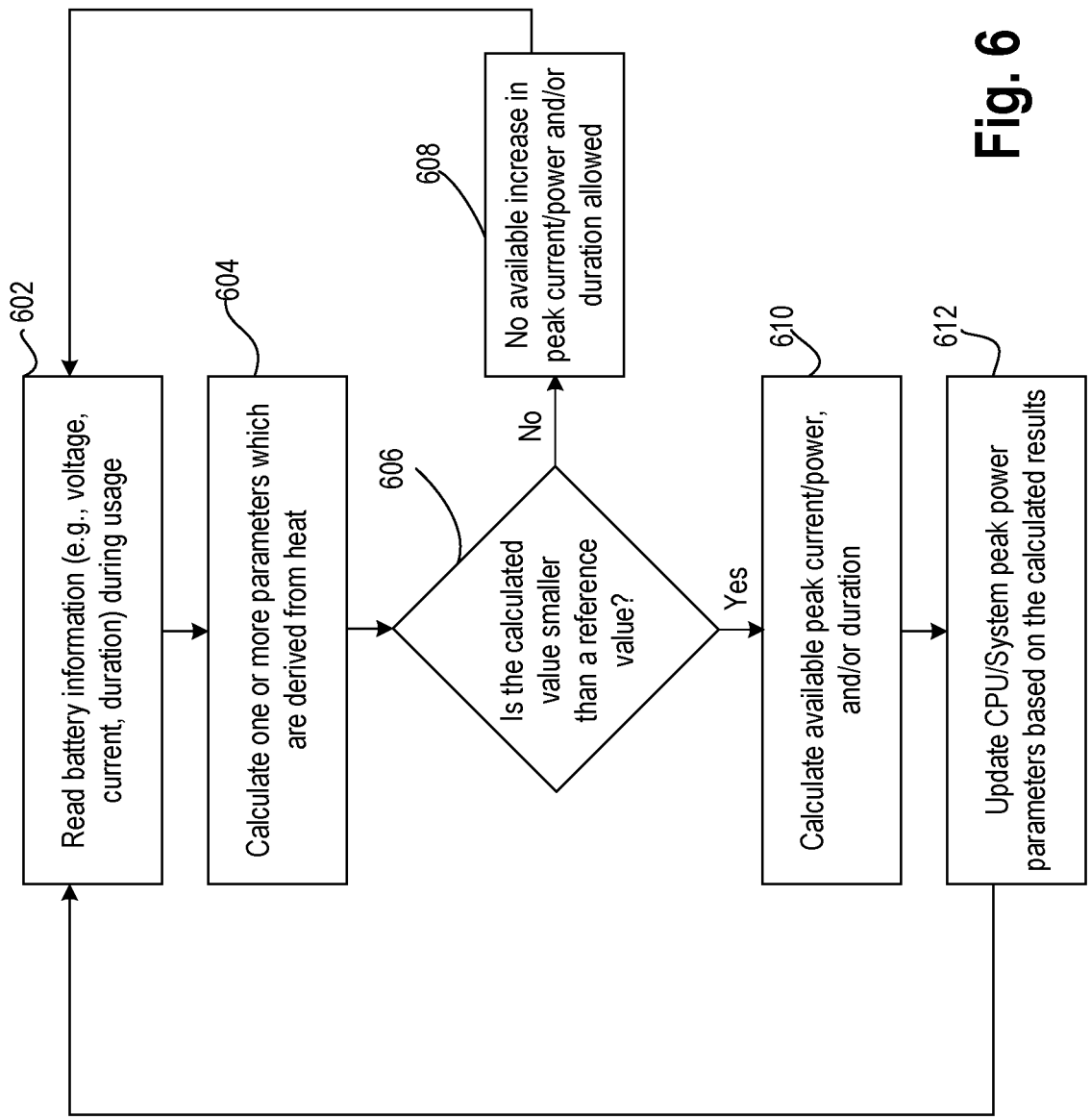
FIG. 6 illustrates a flowchart of a process for implementing battery heat balancing during a peak power mode in accordance with some embodiments.

FIG. 6 illustrates a flowchart of a process for implementing battery heat balancing during a peak power mode in accordance with some embodiments. While various blocks are shown in a particular order, the order can be modified. For example, some blocks can be performed before others while some can be performed in parallel.

In some embodiments, the process can be implemented in firmware of a battery pack (for example, in firmware of battery back 104 and/or in firmware of battery pack 204). In some embodiments, the process can be implemented in firmware and/or in an operating system (OS) of a computing system (for example, in firmware and/or OS of computing system 102 or in firmware and/or OS of a system in system 200). In some embodiments, the process can be using embedded controller 206 and/or using firmware/software 208. In some embodiments, the process can be implemented using fuel gauge IC 242 and/or protection IC 244. In some embodiments, the process can be implemented in a remote storage media. For example, when the process can be implemented using instructions stored in a remote location for controlling a personal computer (PC) or a datacenter in a different location.

In the flowchart, step 602 includes reading battery information (e.g., voltage, current and duration) during usage of the battery, for example, while the battery is powering a computing system such as a laptop or notebook computer. Step 604 includes calculating one or more parameters which are derived from heat. The one or more parameters can include P×t, I²×t, V×I×t, P, I²×R, V×I and/or I RMS.

A decision step 606 determines whether the calculated or derived value(s) for the one or more parameters are smaller than a reference value (for example, smaller than an accumulated reference heat). In some embodiments, the reference value is also based on one or more parameters derived from a reference heat and/or thermal threshold, one or more parameters derived from activation energy of chemical reaction such as battery degradation reaction, and/or any threshold value regardless of heat. The threshold value may adaptively change based on factors such as battery aging status and temperature. As such, a reference other than heat can be used for implementing heat power mode.

If the answer to the decision step 606 is "No," step 608 indicates no increase in peak current/power and/or duration is allowed, and the flow returns to step 602. The process of FIG. 6 can be repeated at different times, such as periodically or otherwise intermittently. In one approach, the process is repeated for each peak power cycle. In another approach, the process is repeated for every N peak power cycles, where N>1. If the answer to the decision step 606 is "Yes," step 610 calculates available peak current/power and/or duration (for example, in some embodiments, using Equation 8). In this case, an increase in peak current/power and/or duration is allowed. The duration can refer to $t_{ON}$, for example. The new value calculated at step 610 is then reported (for example, to a processor such as a CPU and/or to a computing system) at step 612. This step includes updating the CPU/System peak power parameters based on the calculated results. The flow then returns to step 602. In some embodiments (for example, included in some embodiments of the process of FIG. 6 and in other embodiments), a heat situation (for example, a heat situation such as a condition where generated heat is not smaller than a reference heat) is reported (for example, a heat situation is reported to a processor such as a CPU and/or to a computing system) in order to have the system power capped until the accumulated heat (for example, accumulated battery heat) falls below a reference threshold level.

In accordance with some embodiments, forced cooling and/or a heat spreader may be applied (for example, during peak power mode) to the battery to maintain battery temperature or heat balance similar to that of the battery under the reference condition.

In some embodiments, heat may be used herein as referring to joule heat. However, in some embodiments, heat by chemical reaction may also be considered (either in addition to joule heat or instead of joule heat, for example). For example, in some embodiments, Equation 11 may be used (for example, instead of Equation 1), as follows:

$$H(\text{peak power})+H(\text{chemical reaction during peak power})=H(\text{ref})+H(\text{chemical reaction during reference condition}) \quad (11)$$

where H(chemical reaction during peak power) is a heat by chemical reaction during peak power, and H(chemical reaction during reference condition) is a heat by chemical reaction during reference condition.

It is noted that an alternative Equation 11 may be implemented in accordance with some embodiments, as follows:

$$H(\text{peak power})+H(\text{chemical reaction during peak power}) \leq H(\text{ref})+H(\text{chemical reaction during reference condition}) \quad (12)$$

In some embodiments, various techniques may be implemented by user setting (for example, a user determining whether to use joule heat or chemical heat, a user choosing one or more values such as $I_{r1}$, $I_{p1}$, $t_{ON}$, $I_N$, and/or $t_{OFF}$, etc.).

In some embodiments, battery degradation rate by heat may be measured in advance, heat output associated with allowable degradation may be selected, and another wave form of peak power mode giving the same degradation of heat may be chosen.

In some embodiments, as a result of heat calculation, if the battery stays within an allowable temperature range, higher peak current may be extracted until battery temperature exceeds an allowable range. For example, alternative equations for heat may be used as follows (for example, instead of Equation 1 and/or instead of Alternative Equation 1):

$$H(\text{peak power}) < H(\text{allowable}) \quad (13)$$

$$H(\text{peak power}) \leq H(\text{allowable}) \quad (14)$$

where H(allowable) is an allowable heat value. The allowable temperature value H(allowable), or allowable temperature range, may be used. It may be determined by a system manufacturer and stored in a memory or storage space, for example.

In some embodiments, a relationship between discharge current, battery temperature rise and/or degradation, etc. may be predetermined.

In some embodiments, any of the techniques described herein may be implemented by instructions stored in storage or memory as software or firmware on the system side. In some embodiments, any of the techniques described herein may be implemented by instructions stored in storage or memory device as software or firmware on the battery pack side (for example, in a fuel gauging IC). The storage or memory device can be a non-transitory machine-readable storage media.

In some embodiments, available peak power and/or peak current may be determined based on a battery thermal budget (for example, by considering allowable heat as part of a battery thermal budget).

In some embodiments, open circuit voltage ($V_{OCV}$) may be (but is not limited to) battery voltage after relaxation (for example, for tens of seconds or for minutes).

In some embodiments, open circuit voltage ($V_{OCV}$) may be directly measured, or may be modeled, or may be retrieved from a lookup table (for example, a lookup table stored in memory or other storage).

In some embodiments, techniques described herein can be implemented in a system, memory space of a system, in a controller, in a memory space of a controller in a system, and/or in a battery pack, for example. In some embodiments, techniques described herein can be implemented in a remote system.

In some embodiments, techniques described herein (and/or implemented by a controller described herein) may be implemented by a firmware embedded solution, an FPGA, a DSP, a discrete ASIC, and/or a processor, etc.

In some embodiments, a system (for example, system 100 and/or system 200) can be one or more of a computing system, a stationary system, a data center system, a server, a car, and/or a system supporting peak power, etc.

Figure 7:
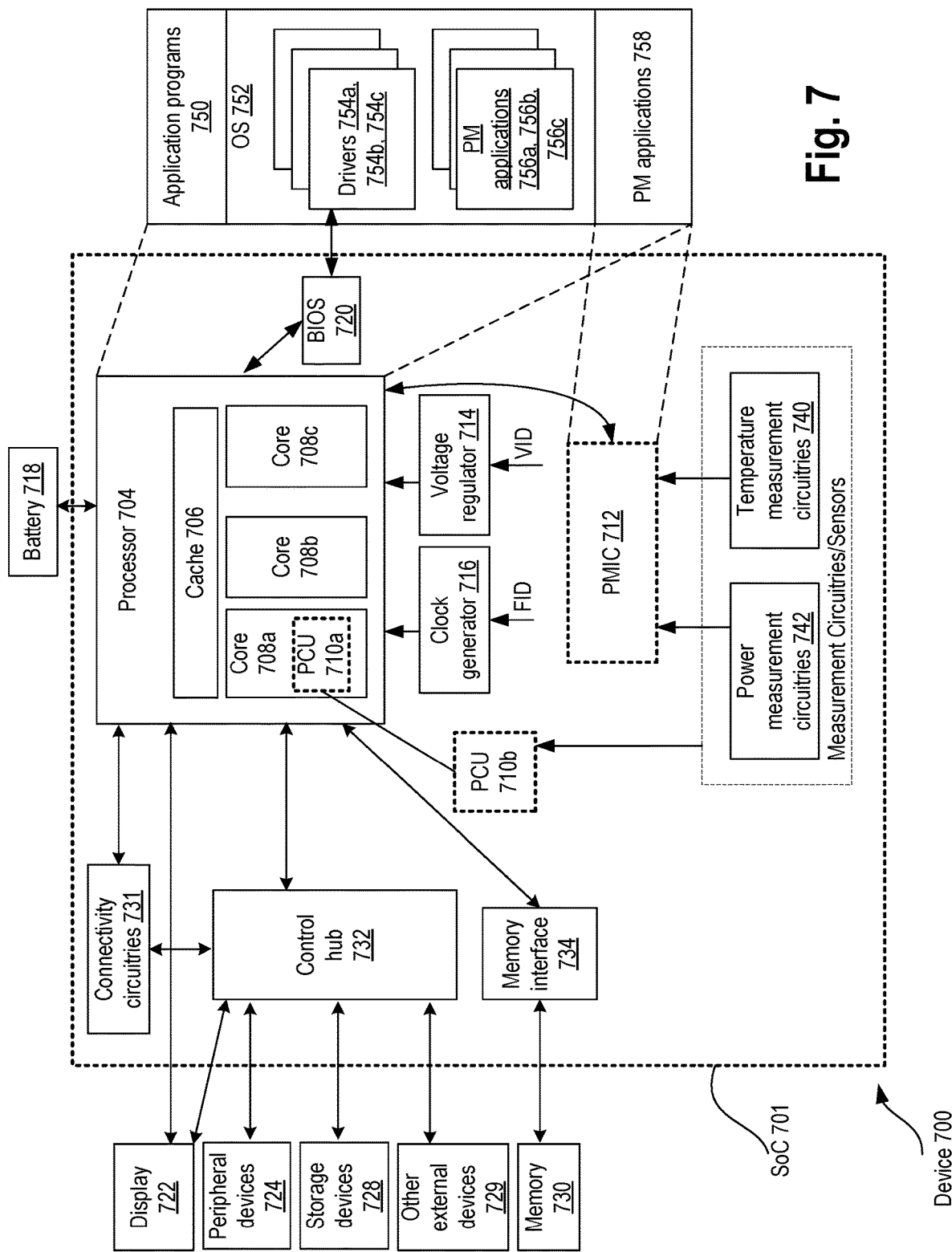
FIG. 7 illustrates a smart device or a computer system or a SoC (System-on-Chip) powered by a battery and capable of heat balancing during peak power mode, in accordance with some embodiments.

FIG. 7 illustrates a smart device or a computer system or a SoC (System-on-Chip) powered by a battery and capable of heat balancing during peak power mode, in accordance with some embodiments. It is pointed out that those elements of FIG. 7 having the same reference numbers (or names) as the elements of any other figure may operate or function in any manner similar to that described, but are not limited to such. The battery 718 may correspond to the battery pack 104 of FIG. 1 or the battery pack 204 of FIG. 2. The SoC 701 may correspond to the system 102 of FIG. 1 or the system 200 of FIG. 2. The processor 704 may correspond to the processor 122 of FIG. 1 or the processor and Other System Components 212 of FIG. 2.

In some embodiments, device 700 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 700.

In an example, the device 700 comprises an SoC (System-on-Chip) 701. An example boundary of the SoC 701 is illustrated using dotted lines in FIG. 9, with some example components being illustrated to be included within SoC 701—however, SoC 701 may include any appropriate components of device 700.

In some embodiments, device 700 includes processor 704. Processor 704 can include one or more physical devices, such as microprocessors, application processors, microcontrollers, programmable logic devices, processing cores, or other processing means. The processing operations performed by processor 704 include the execution of an operating platform or operating system on which applications and/or device functions are executed. The processing operations include operations related to I/O (input/output) with a human user or with other devices, operations related to power management, operations related to connecting computing device 700 to another device, and/or the like. The processing operations may also include operations related to audio I/O and/or display I/O.

In some embodiments, processor 704 includes multiple processing cores (also referred to as cores) 708a, 708b, 708c. Although merely three cores 708a, 708b, 708c are illustrated in FIG. 7, processor 704 may include any other appropriate number of processing cores, e.g., tens, or even hundreds of processing cores. Processor cores 708a, 708b, 708c may be implemented on a single integrated circuit (IC) chip. Moreover, the chip may include one or more shared and/or private caches, buses or interconnections, graphics and/or memory controllers, or other components.

In some embodiments, processor 704 includes cache 706. In an example, sections of cache 706 may be dedicated to individual cores 708 (e.g., a first section of cache 706 dedicated to core 708a, a second section of cache 706 dedicated to core 708b, and so on). In an example, one or more sections of cache 706 may be shared among two or more of cores 708. Cache 706 may be split in different levels, e.g., level 1 (L1) cache, level 2 (L2) cache, level 3 (L3) cache, etc.

In some embodiments, processor core 704 may include a fetch unit to fetch instructions (including instructions with conditional branches) for execution by the core 704. The instructions may be fetched from any storage devices such as the memory 730. Processor core 704 may also include a decode unit to decode the fetched instruction. For example, the decode unit may decode the fetched instruction into a plurality of micro-operations. Processor core 704 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 704 may be an out-of-order processor core in one embodiment. Processor core 704 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 704 may also include a bus unit to enable communication between components of processor core 704 and other components via one or more buses. Processor core 704 may also include one or more registers to store data accessed by various components of the core 704 (such as values related to assigned app priorities and/or sub-system states (modes) association.

In some embodiments, device 700 comprises connectivity circuitries 731. For example, connectivity circuitries 731 includes hardware devices (e.g., wireless and/or wired connectors and communication hardware) and/or software components (e.g., drivers, protocol stacks), e.g., to enable device 700 to communicate with external devices. Device 700 may be separate from the external devices, such as other computing devices, wireless access points or base stations, etc.

In an example, connectivity circuitries 731 may include multiple different types of connectivity. To generalize, the connectivity circuitries 731 may include cellular connectivity circuitries, wireless connectivity circuitries, etc. Cellular connectivity circuitries of connectivity circuitries 731 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 731 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 731 may include a network interface, such as a wired or wireless interface, e.g., so that a system embodiment may be incorporated into a wireless device, for example, a cell phone or personal digital assistant.

In some embodiments, device 700 comprises control hub 732, which represents hardware devices and/or software components related to interaction with one or more I/O devices. For example, processor 704 may communicate with one or more of display 722, one or more peripheral devices 724, storage devices 728, one or more other external devices 729, etc., via control hub 732. Control hub 732 may be a chipset, a Platform Control Hub (PCH), and/or the like.

For example, control hub 732 illustrates one or more connection points for additional devices that connect to device 700, e.g., through which a user might interact with the system. For example, devices (e.g., devices 729) that can be attached to device 700 include microphone devices, speaker or stereo systems, audio devices, video systems or other display devices, keyboard or keypad devices, or other I/O devices for use with specific applications such as card readers or other devices.

As mentioned above, control hub 732 can interact with audio devices, display 722, etc. For example, input through a microphone or other audio device can provide input or commands for one or more applications or functions of device 700. Additionally, audio output can be provided instead of, or in addition to display output. In another example, if display 722 includes a touch screen, display 722 also acts as an input device, which can be at least partially managed by control hub 732. There can also be additional buttons or switches on computing device 700 to provide I/O functions managed by control hub 732. In one embodiment, control hub 732 manages devices such as accelerometers, cameras, light sensors or other environmental sensors, or other hardware that can be included in device 700. The input can be part of direct user interaction, as well as providing environmental input to the system to influence its operations (such as filtering for noise, adjusting displays for brightness detection, applying a flash for a camera, or other features).

In some embodiments, control hub 732 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 722 represents hardware (e.g., display devices) and software (e.g., drivers) components that provide a visual and/or tactile display for a user to interact with device 700. Display 722 may include a display interface, a display screen, and/or hardware device used to provide a display to a user. In some embodiments, display 722 includes a touch screen (or touch pad) device that provides both output and input to a user. In an example, display 722 may communicate directly with the processor 704. Display 722 can be one or more of an internal display device, as in a mobile electronic device or a laptop device or an external display device attached via a display interface (e.g., DisplayPort, etc.). In one embodiment display 722 can be a head mounted display (HMD) such as a stereoscopic display device for use in virtual reality (VR) applications or augmented reality (AR) applications.

In some embodiments, and although not illustrated in the figure, in addition to (or instead of) processor 704, device 700 may include Graphics Processing Unit (GPU) comprising one or more graphics processing cores, which may control one or more aspects of displaying contents on display 722.

Control hub 732 (or platform controller hub) may include hardware interfaces and connectors, as well as software components (e.g., drivers, protocol stacks) to make peripheral connections, e.g., to peripheral devices 724.

It will be understood that device 700 could both be a peripheral device to other computing devices, as well as have peripheral devices connected to it. Device 700 may have a "docking" connector to connect to other computing devices for purposes such as managing (e.g., downloading and/or uploading, changing, synchronizing) content on device 700. Additionally, a docking connector can allow device 700 to connect to certain peripherals that allow computing device 700 to control content output, for example, to audiovisual or other systems.

In addition to a proprietary docking connector or other proprietary connection hardware, device 700 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 731 may be coupled to control hub 732, e.g., in addition to, or instead of, being coupled directly to the processor 704. In some embodiments, display 722 may be coupled to control hub 732, e.g., in addition to, or instead of, being coupled directly to processor 704.

In some embodiments, device 700 comprises memory 730 coupled to processor 704 via memory interface 734. Memory 730 includes memory devices for storing information in device 700.

In some embodiments, memory 730 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 730 can be a dynamic random-access memory (DRAM) device, a static random-access memory (SRAM) device, flash memory device, phase-change memory device, or some other memory device having suitable performance to serve as process memory. In one embodiment, memory 730 can operate as system memory for device 700, to store data and instructions for use when the one or more processors 704 executes an application or process. Memory 730 can store application data, user data, music, photos, documents, or other data, as well as system data (whether long-term or temporary) related to the execution of the applications and functions of device 700.

Elements of various embodiments and examples are also provided as a machine-readable medium (e.g., memory 730) for storing the computer-executable instructions (e.g., instructions to implement any other processes discussed herein). The machine-readable medium (e.g., memory 730) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 700 comprises temperature measurement circuitries 740, e.g., for measuring temperature of various components of device 700. In an example, temperature measurement circuitries 740 may be embedded, or coupled or attached to various components, whose temperature are to be measured and monitored. For example, temperature measurement circuitries 740 may measure temperature of (or within) one or more of cores 708a, 708b, 708c, voltage regulator 714, memory 730, a mother-board of SoC 701, and/or any appropriate component of device 700.

In some embodiments, device 700 comprises power measurement circuitries 742, e.g., for measuring power consumed by one or more components of the device 700. In an example, in addition to, or instead of, measuring power, the power measurement circuitries 742 may measure voltage and/or current. In an example, the power measurement circuitries 742 may be embedded, or coupled or attached to various components, whose power, voltage, and/or current consumption are to be measured and monitored. For example, power measurement circuitries 742 may measure power, current and/or voltage supplied by one or more voltage regulators 714, power supplied to SoC 701, power supplied to device 700, power consumed by processor 704 (or any other component) of device 700, etc.

In some embodiments, device 700 comprises one or more voltage regulator circuitries, generally referred to as voltage regulator (VR) 714. VR 714 generates signals at appropriate voltage levels, which may be supplied to operate any appropriate components of the device 700. Merely as an example, VR 714 is illustrated to be supplying signals to processor 704 of device 700. In some embodiments, VR 714 receives one or more Voltage Identification (VID) signals, and generates the voltage signal at an appropriate level, based on the VID signals. Various type of VRs may be utilized for the VR 714. For example, VR 714 may include a "buck" VR, "boost" VR, a combination of buck and boost VRs, low dropout (LDO) regulators, switching DC-DC regulators, constant-on-time controller-based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 710a/b and/or PMIC 712. In some embodiments, each core has a network of distributed LDOs to provide efficient control for power management. The LDOs can be digital, analog, or a combination of digital or analog LDOs. In some embodiments, VR 714 includes current tracking apparatus to measure current through power supply rail(s).

In some embodiments, device 700 comprises one or more clock generator circuitries, generally referred to as clock generator 716. Clock generator 716 generates clock signals at appropriate frequency levels, which may be supplied to any appropriate components of device 700. Merely as an example, clock generator 716 is illustrated to be supplying clock signals to processor 704 of device 700. In some embodiments, clock generator 716 receives one or more Frequency Identification (FID) signals, and generates the clock signals at an appropriate frequency, based on the FID signals.

In some embodiments, device 700 comprises battery 718 supplying power to various components of device 700. Merely as an example, battery 718 is illustrated to be supplying power to processor 704. Although not illustrated in the figures, device 700 may comprise a charging circuitry, e.g., to recharge the battery, based on Alternating Current (AC) power supply received from an AC adapter.

In some embodiments, device 700 comprises Power Control Unit (PCU) 710 (also referred to as Power Management Unit (PMU), Power Controller, etc.). In an example, some sections of PCU 710 may be implemented by one or more processing cores 708, and these sections of PCU 710 are symbolically illustrated using a dotted box and labelled PCU 710a. In an example, some other sections of PCU 710 may be implemented outside the processing cores 708, and these sections of PCU 710 are symbolically illustrated using a dotted box and labelled as PCU 710b. PCU 710 may implement various power management operations for device 700. PCU 710 may include hardware interfaces, hardware circuitries, connectors, registers, etc., as well as software components (e.g., drivers, protocol stacks), to implement various power management operations for device 700.

In some embodiments, device 700 comprises Power Management Integrated Circuit (PMIC) 712, e.g., to implement various power management operations for device 700. In some embodiments, PMIC 712 is a Reconfigurable Power Management ICs (RPMICs) and/or an IMVP (Intel® Mobile Voltage Positioning). In an example, the PMIC is within an IC chip separate from processor 704. The may implement various power management operations for device 700. PMIC 712 may include hardware interfaces, hardware circuitries, connectors, registers, etc., as well as software components (e.g., drivers, protocol stacks), to implement various power management operations for device 700.

In an example, device 700 comprises one or both PCU 710 or PMIC 712. In an example, any one of PCU 710 or PMIC 712 may be absent in device 700, and hence, these components are illustrated using dotted lines.

Various power management operations of device 700 may be performed by PCU 710, by PMIC 712, or by a combination of PCU 710 and PMIC 712. For example, PCU 710 and/or PMIC 712 may select a power state (e.g., P-state) for various components of device 700. For example, PCU 710 and/or PMIC 712 may select a power state (e.g., in accordance with the ACPI (Advanced Configuration and Power Interface) specification) for various components of device 700. Merely as an example, PCU 710 and/or PMIC 712 may cause various components of the device 700 to transition to a sleep state, to an active state, to an appropriate C state (e.g., C0 state, or another appropriate C state, in accordance with the ACPI specification), etc. In an example, PCU 710 and/or PMIC 712 may control a voltage output by VR 714 and/or a frequency of a clock signal output by the clock generator, e.g., by outputting the VID signal and/or the FID signal, respectively. In an example, PCU 710 and/or PMIC 712 may control battery power usage, charging of battery 718, and features related to power saving operation.

The clock generator 716 can comprise a phase locked loop (PLL), frequency locked loop (FLL), or any suitable clock source. In some embodiments, each core of processor 704 has its own clock source. As such, each core can operate at a frequency independent of the frequency of operation of the other core. In some embodiments, PCU 710 and/or PMIC 712 performs adaptive or dynamic frequency scaling or adjustment. For example, clock frequency of a processor core can be increased if the core is not operating at its maximum power consumption threshold or limit. In some embodiments, PCU 710 and/or PMIC 712 determines the operating condition of each core of a processor, and opportunistically adjusts frequency and/or power supply voltage of that core without the core clocking source (e.g., PLL of that core) losing lock when the PCU 710 and/or PMIC 712 determines that the core is operating below a target performance level. For example, if a core is drawing current from a power supply rail less than a total current allocated for that core or processor 704, then PCU 710 and/or PMIC 712 can temporality increase the power draw for that core or processor 704 (e.g., by increasing clock frequency and/or power supply voltage level) so that the core or processor 704 can perform at higher performance level. As such, voltage and/or frequency can be increased temporality for processor 704 without violating product reliability.

In an example, PCU 710 and/or PMIC 712 may perform power management operations, e.g., based at least in part on receiving measurements from power measurement circuitries 742, temperature measurement circuitries 740, charge level of battery 718, and/or any other appropriate information that may be used for power management. To that end, PMIC 712 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 710 and/or PMIC 712 in at least one embodiment to allow PCU 710 and/or PMIC 712 to manage processor core energy at least in part based on value(s) detected by one or more of the sensors.

Also illustrated is an example software stack of device 700 (although not all elements of the software stack are illustrated). Merely as an example, processors 704 may execute application programs 750, Operating System 752, one or more Power Management (PM) specific application programs (e.g., generically referred to as PM applications 758), and/or the like. PM applications 758 may also be executed by the PCU 710 and/or PMIC 712. OS 752 may also include one or more PM applications 756a, 756b, 756c. The OS 752 may also include various drivers 754a, 754b, 754c, etc., some of which may be specific for power management purposes. In some embodiments, device 700 may further comprise a Basic Input/output System (BIOS) 720. BIOS 720 may communicate with OS 752 (e.g., via one or more drivers 754), communicate with processors 704, etc.

For example, one or more of PM applications 758, 756, drivers 754, BIOS 720, etc. may be used to implement power management specific tasks, e.g., to control voltage and/or frequency of various components of device 700, to control wake-up state, sleep state, and/or any other appropriate power state of various components of device 700, control battery power usage, charging of the battery 718, features related to power saving operation, etc.

In some embodiments, battery 718 is a Li-metal battery with a pressure chamber to allow uniform pressure on a battery. The pressure chamber is supported by metal plates (such as pressure equalization plate) used to give uniform pressure to the battery. The pressure chamber may include pressured gas, elastic material, spring plate, etc. The outer skin of the pressure chamber is free to bow, restrained at its edges by (metal) skin, but still exerts a uniform pressure on the plate that is compressing the battery cell. The pressure chamber gives uniform pressure to battery, which is used to enable high-energy density battery with, for example, 20% more battery life.

In some embodiments, a control unit (in processor 704 and/or battery 718) is configured to consider heat of battery 718 when entering peak power mode. System of FIG. 7 may enhance its performance by extracting additional current from an attached battery in a peak power mode.

In some embodiments, the control unit includes logic which is adapted to: provide power from a battery to a system during a peak power mode that includes peak power and off-peak power; consider balance of first one or more parameters derived from heat or heat over time period between the peak power and/or the off-peak power and a reference condition of the battery; and maintain the first one or more parameters derived from the heat or the heat over time period under the peak power mode to be the same as or less than a second one or more parameters derived from a heat from the battery over the time period under the reference condition of the battery. In some embodiments, the first and second one or more parameters include $I^2t$, where I is current and t is a duration of the current. In some embodiments, the second one or more parameters are: derived from a reference heat or thermal threshold, derived from activation energy of a chemical reaction; derived from activation energy of a battery degradation reaction; and/or a threshold value regardless of heat. As such, system of FIG. 7 can operate at peak power mode without degrading battery 718. In some embodiments, the first one or more parameters include $I^2t$, where I is current and t is a duration of the current. In some embodiments, calculation and control of the first and/or second one or more parameters derived from heat directly or indirectly apply one or more of power, current, duration, battery temperature, battery impedance and/or impedance in power delivery. In some embodiments, the logic of the control unit is adapted to maintain the first and/or second one or more parameters derived from the heat or heat over time period from the battery over the time period under the peak power mode to be the same as or less than an allowable heat. In some embodiments, the logic of the control unit is adapted to provide peak current in steps including at least one peak current and at least one off-peak current.

In some embodiments, firmware executing on PCU 710*a/b* has a capability to enable extra compute and telemetries resources for the runtime support of the firmware. Here firmware refers to a firmware executed by PCU 710*a/b* to manage performance of the 701. For example, firmware may set frequencies and appropriate voltages for the processor. Part of the firmware is accessible via OS 752. In various embodiments, mechanisms and methods are provided that dynamically change an Energy Performance Preference (EPP) value based on workloads, user behavior, and/or system conditions. There may be a well-defined interface between OS 752 and the firmware. The interface may allow or facilitate the software configuration of several parameters and/or may provide hints to the firmware. As an example, an EPP parameter may inform a firmware algorithm as to whether performance or battery life is more important.

This support may be done as well by the OS 752 by including machine-learning support as part of OS 752 and either tuning the EPP value that the OS hints to the hardware (e.g., various components of SCO 701) by machine-learning prediction, or by delivering the machine-learning prediction to the firmware in a manner similar to that done by a Dynamic Tuning Technology (DTT) driver. In this model, OS 752 may have visibility to the same set of telemetries as are available to a DTT. As a result of a DTT machine-learning hint setting, firmware may tune its internal algorithms to achieve optimal power and performance results following the machine-learning prediction of activation type. The firmware as example may increase the responsibility for the processor utilization change to enable fast response for user activity, or may increase the bias for energy saving either by reducing the responsibility for the processor utilization or by saving more power and increasing the performance lost by tuning the energy saving optimization. This approach may facilitate saving more battery life in case the types of activities enabled lose some performance level over what the system can enable. The firmware may include an algorithm for dynamic EPP that may take the two inputs, one from OS 752 and the other from software such as DTT, and may selectively choose to provide higher performance and/or responsiveness. As part of this method, the firmware may enable in the DTT an option to tune its reaction for the DTT for different types of activity.

Some non-limiting examples of various embodiments are presented below.

Example 1 includes a control unit comprising logic adapted to: provide power from a battery to a computer system in one or more cycles of a peak power mode, wherein each cycle comprises a peak power and an off peak power; consider one or more parameters derived from heat or heat over a time period under the peak power mode and a reference condition of the battery; and among the one or more parameters, maintain first one or more parameters derived from the heat or the heat over a time period under the peak power mode to be the same as or less than second one or more parameters derived from a heat from the battery over the time period under the reference condition of the battery.

Example 2 includes the control unit of Example 1, wherein: each cycle comprises a peak current $I_{p1}$ for a time $t_{ON}$ and an off-peak current $I_{p2}$ for a time $t_{OFF}$; the control unit comprises logic adapted to set one or more parameters of the peak power mode based on a heat budget and a reference condition of the battery; and the setting of the one or more parameters of the peak power mode maintains the following relationship:

$$(I_{p1}^2 \times t_{on}) + (I_{p2}^2 \times t_{off}) \leq (I_{r1}^2 \times (t_{on} + t_{off}))$$

where $I_{r1}$ is a current under a reference condition.

Example 3 includes the control unit of Example 1 or 2, wherein: the first and/or second one or more parameters include at least one of P×t, $I^2$×t, V×I×t, P, $I^2$×R, V×I and/or I RMS, where P is power, I is current, t is duration, V is voltage and R is resistance.

Example 4 includes the control unit of any one of Examples 1-3, wherein the second one or more parameters are: derived from a reference heat or thermal threshold; derived from activation energy of a chemical reaction; derived from activation energy of a battery degradation reaction; and/or a threshold value regardless of heat.

Example 5 includes the control unit of any one of Examples 1-4, wherein calculation and control of the first and/or second one or more parameters derived from heat directly or indirectly apply one or more of power, current, duration, battery temperature, battery impedance and/or impedance in power delivery.

Example 6 includes a control unit comprising logic adapted to: provide power from a battery to a computer system in one or more cycles of a peak power mode, wherein each cycle comprises a peak current $I_{p1}$ for a time $t_{ON}$ and an off-peak current $I_{p2}$ for a time $t_{OFF}$; and set one or more parameters of the peak power mode based on a heat budget and a reference condition of the battery, wherein the setting of the one or more parameters of the peak power mode maintains the following relationship:

$$(I_{p1}^2 \times t_{on}) + (I_{p2}^2 \times t_{off}) \leq (I_{r1}^2 \times (t_{on} + t_{off}))$$

where $I_{r1}$ is a current under a reference condition.

Example 7 includes the control unit of Example 6, wherein the one or more parameters comprise at least one of the peak current $I_{p1}$, the time $t_{ON}$ or the time $t_{OFF}$.

Example 8 includes the control unit of Example 6 or 7, wherein the setting of the one or more parameters maintains a heat from the battery over the one or more cycles to be no greater than a heat from the battery under the reference condition.

Example 9 includes the control unit of any one of Examples 6-8, wherein the setting of the one or more parameters is based on one or more parameters derived from heat.

Example 10 includes the control unit of any one of Examples 6-9, wherein the peak current $I_{p1}$ varies in different cycles of the one or more cycles.

Example 11 includes the control unit of any one of Examples 6-10, wherein the time $t_{ON}$ varies in different cycles of the one or more cycles.

Example 12 includes a non-transitory machine-readable storage media having machine readable instructions stored thereon that when executed cause one or more machines to perform a method comprising: providing power from a battery to a computer system during a plurality of cycles of a peak power mode, wherein each cycle comprises a peak current $I_{p1}$ for a time $t_{ON}$ and an off-peak current $I_{p2}$ for a time $t_{OFF}$; and setting one or more parameters of the peak power mode to maintain the following relationship:

$$\Sigma(I_{p1}^2 \times R_{p1} \times t_{on}) + \Sigma(I_{p2}^2 \times R_{p2} \times t_{off}) \leq \text{Value\_ref},$$

where $R_{p1}$ is an impedance of the battery during the peak current, $R_{p2}$ is an impedance of the battery during the off-peak current and Value_ref is a predetermined reference value.

Example 13 includes the non-transitory machine-readable storage media of Example 12, wherein the summations are taken over the plurality of cycles.

Example 14 includes the non-transitory machine-readable storage media of Example 12 or 13, wherein: the one or more parameters which are set comprise the peak current $I_{p1}$; and the peak current $I_{p1}$ is different in different cycles of the plurality of cycles.

Example 15 includes the non-transitory machine-readable storage media of any one of Examples 12-14, wherein the one or more parameters which are set comprise the time $t_{ON}$; and the time $t_{ON}$ is different in different cycles of the plurality of cycles.

Example 16 includes the non-transitory machine-readable storage media of any one of Examples 12-15, wherein the setting of the one or more parameters maintains a heat from the battery over the one or more cycles to be no greater than a heat from the battery under the reference condition.

Example 17 includes the non-transitory machine-readable storage media of any one of Examples 12-16, wherein the setting of the one or more parameters is based on at least one of power, current, duration, battery impedance and/or impedance in power delivery.

Example 18 includes the non-transitory machine-readable storage media of any one of Examples 12-17, wherein the setting of the one or more parameters is based on at least one of P×t, $I^2$×t, V×I×t, P, $I^2$×R, V×I and/or I RMS, where P is power, I is current, t is duration, V is voltage and R is resistance.

Example 19 includes a non-transitory machine-readable storage media having machine readable instructions stored thereon that when executed cause one or more machines to perform a method comprising: providing power from a battery to a computer system during a plurality of cycles of a peak power mode, wherein each cycle comprises a peak current $I_{p1}$ for a time $t_{ON}$ and an off-peak current $I_{p2}$ for a time $t_{OFF}$; and setting one or more parameters of the peak power mode to maintain the following relationship:

$$\Sigma(I_{p1}^2 \times t_{on}) + \Sigma(I_{p2}^2 \times t_{off}) \leq \text{Value\_ref},$$

where Value_ref is a predetermined reference value.

Example 20 includes the non-transitory machine-readable storage media of Example 19, wherein the one or more parameters which are set comprise at least one of the peak current $I_{p1}$, the time $t_{ON}$ or the time $t_{OFF}$.

Example 21 includes the non-transitory machine-readable storage media of Example 19 or 20, wherein the one or more parameters vary in different cycles of the plurality of cycles.

Example 22 includes an apparatus, comprising: a memory device to store instructions; and a processor to execute the instructions to: provide power from a battery to a computer system in a plurality of cycles of a peak power mode, wherein each cycle comprises a peak current $I_{p1}$ for a time $t_{ON}$ and an off-peak current $I_{p2}$ for a time $t_{OFF}$; and adjust one or more parameters of the peak power mode based on a heat budget, such that the one or more parameters are different in different cycles of the plurality of cycles.

Example 23 includes the apparatus of Example 22, wherein the one or more parameters comprise the peak current $I_{p1}$.

Example 24 includes the apparatus of Example 22 or 23, wherein the one or more parameters comprise the time $t_{ON}$.

Example 24 includes the apparatus of any one of Examples 22-24, wherein the one or more parameters comprise a duty cycle.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. A control unit comprising a logic circuit adapted to:
provide power from a battery to a computer system in one or more cycles of a peak power mode, wherein each cycle comprises a peak power and an off-peak power;
read one or more parameters derived from heat or heat over a time period under the peak power mode and a reference condition of the battery; and among the one or more parameters, maintain first one or more parameters derived from the at least one of heat or the heat over the time period under the peak power mode to be the same as or less than second one or more parameters derived from a-heat from the battery over the time period under the reference condition of the battery, wherein at least one of the first one or more parameters or the second one or more parameters include at least one of P×t, I2×t, V×I×t, P, I2×R, V×I or I RMS, where P is power, I is current, t is duration, V is voltage and R is resistance.

2. The control unit of claim 1, wherein:
each cycle comprises a peak current $I_{p1}$ for a time $t_{ON}$ and an off-peak current $I_{p2}$ for a time $t_{OFF}$;
the logic circuit is adapted to set one or more parameters of the peak power mode based on a heat budget and a reference condition of the battery; and the setting of the one or more parameters of the peak power mode maintains the following relationship:

$$(I_{p1}^2 \times t_{on}) + (I_{p2}^2 \times t_{off}) \leq (I_{r1}^2 \times (t_{on} + t_{off}))$$

where $I_{r1}$ is a current under a reference condition.

3. The control unit of claim 2, wherein the at least one of the first one or more parameters or the second one or more parameters comprise at least one of the peak current $I_{p1}$, the time $t_{ON}$ or the time $t_{OFF}$.

4. The control unit of claim 1, wherein the second one or more parameters are at least one of:
derived from a reference heat or thermal threshold;
derived from activation energy of a chemical reaction;
derived from activation energy of a battery degradation reaction; or
a threshold value regardless of heat.

5. The control unit of claim 1, wherein calculation and control of at least one of the first or second one or more parameters derived from heat directly or indirectly apply one or more of power, current, duration, battery temperature, battery impedance, or impedance in power delivery.

6. A control unit comprising a logic circuit adapted to:
provide power from a battery to a computer system in one or more cycles of a peak power mode, wherein each cycle comprises a peak current $I_{p1}$ for a time $t_{ON}$ and an off-peak current $I_{p2}$ for a time $t_{OFF}$; and
set one or more parameters of the peak power mode based on a heat budget and a reference condition of the battery, wherein the setting of the one or more parameters of the peak power mode maintains the following relationship:

$$(I_{p1}^2 \times t_{on}) + (I_{p2}^2 \times t_{off}) \leq (I_{r1}^2 \times (t_{on} + t_{off}))$$

where $I_{r1}$ is a current under a reference condition.

7. The control unit of claim 6, wherein the one or more parameters comprise at least one of the peak current $I_{p1}$, the time $t_{ON}$ or the time $t_{OFF}$.

8. The control unit of claim 6, wherein the setting of the one or more parameters maintains a heat from the battery over the one or more cycles to be no greater than a heat from the battery under the reference condition.

9. The control unit of claim 6, wherein the setting of the one or more parameters is based on one or more parameters derived from heat.

10. The control unit of claim 6, wherein the peak current $I_{p1}$ varies in different cycles of the one or more cycles.

11. The control unit of claim 6, wherein the time to varies in different cycles of the one or more cycles.

12. A non-transitory machine-readable storage media having machine-readable instructions stored thereon that when executed cause one or more machines to perform a method comprising:
providing power from a battery to a computer system during a plurality of cycles of a peak power mode, wherein each cycle comprises a peak current $I_{p1}$ for a time $t_{ON}$ and an off-peak current $I_{p2}$ for a time $t_{OFF}$; and
setting one or more parameters of the peak power mode to maintain the following relationship:

$$\Sigma(I_{p1}^2 \times R_{p1} \times t_{on}) + (I_{p2}^1 \times R_{p2} \times t_{off}) \leq \text{Value\_ref},$$

where $R_{p1}$ is an impedance of the battery during the peak current, $R_{p2}$ is an impedance of the battery during the off-peak current and Value_ref is a predetermined reference value.

13. The non-transitory machine-readable storage media of claim 12, wherein the summations $\Sigma$ are taken over the plurality of cycles.

14. The non-transitory machine-readable storage media of claim 12, wherein:
the one or more parameters which are set comprise the peak current $I_{p1}$; and
the peak current $I_{p1}$ is different in different cycles of the plurality of cycles.

15. The non-transitory machine-readable storage media of claim 12, wherein:
the one or more parameters which are set comprise the time $t_{ON}$; and
the time $t_{ON}$ is different in different cycles of the plurality of cycles.

16. The non-transitory machine-readable storage media of claim 12, wherein the setting of the one or more parameters maintains a heat from the battery over the one or more cycles to be no greater than a heat from the battery under a reference condition.

17. The non-transitory machine-readable storage media of claim 12, wherein the setting of the one or more parameters is based on at least one of power, current, duration, battery impedance, or impedance in power delivery.

18. The non-transitory machine-readable storage media of claim 12, wherein the setting of the one or more parameters is based on at least one of P×t, I²×t, V×I×t, P, I²×R, V×I or I RMS, where P is power, I is current, t is duration, V is voltage and R is resistance.

19. A non-transitory machine-readable storage media having machine readable instructions stored thereon that when executed cause one or more machines to perform a method comprising:
providing power from a battery to a computer system during a plurality of cycles of a peak power mode, wherein each cycle comprises a peak current $I_{p1}$ for a time $t_{ON}$ and an off-peak current $I_{p2}$ for a time $t_{OFF}$; and
setting one or more parameters of the peak power mode to maintain the following relationship:

$$\Sigma(I_{p1}^2 \times t_{on}) + \Sigma(I_{p2}^2 \times t_{off}) \leq \text{Value\_ref},$$

where Value_ref is a predetermined reference value.

20. The non-transitory machine-readable storage media of claim 19, wherein the one or more parameters which are set comprise at least one of the peak current $I_{p1}$, the time $t_{ON}$ or the time $t_{OFF}$.

21. The non-transitory machine-readable storage media of claim 19, wherein the one or more parameters vary in different cycles of the plurality of cycles.

22. An apparatus, comprising:
a memory device to store instructions; and
a processor to execute the instructions to:
- provide power from a battery to a computer system in a plurality of cycles of a peak power mode, wherein each cycle comprises a peak current $I_{p1}$ for a time $t_{ON}$ and an off-peak current $I_{p2}$ for a time $t_{OFF}$; and
- adjust one or more parameters of the peak power mode based on a heat budget, such that the one or more parameters are different in different cycles of the plurality of cycles, wherein the adjusting of the one or more parameters maintains the following relationship:

$$(I_{p1}^2 \times t_{on}) + (I_{p2}^2 \times t_{off}) \leq (I_{r1}^2 \times (t_{on} + t_{off}))$$

where $I_{r1}$ is a current under a reference condition.

23. The apparatus of claim 22, wherein the one or more parameters comprise the peak current $I_{p1}$.

24. The apparatus of claim 22, wherein the one or more parameters comprise the time $t_{ON}$.

25. The apparatus of claim 22, wherein the one or more parameters comprise a duty cycle.

\* \* \* \* \*

UNITED STATES PATENT AND TRADEMARK OFFICE
CERTIFICATE OF CORRECTION

PATENT NO. : 12,079,051 B2
APPLICATION NO. : 17/832370
DATED : September 3, 2024
INVENTOR(S) : Naoki Matsumura et al.

It is certified that error appears in the above-identified patent and that said Letters Patent is hereby corrected as shown below:

In the Claims

Column 29

Line 2 In Claim 1, "...derived from the at least one..." should read --...derived from at least one...--

Line 5 In Claim 1, "...derived from a-heat from the battery..." should read --...derived from heat from the battery...--

Line 9 In Claim 1, "...P×t, I2×t, V×I×t, P,I2×R, V×I..." should read --...P × t, I$^2$ × t, V × I × t, P, I$^2$ × R, V × I...--

Line 11 In Claim 1, "...is voltage and R is resistance." should read --...is voltage, and R is resistance.--

Line 66 In Claim 1, "...wherein the time to varies" should read --...wherein time $t_{ON}$ varies--

Column 30

Line 2 In Claim 12, "...instructions stored thereon that when..." should read --...instructions stored thereon, that when...--

Lines 12-13 In Claim 12, "...Σ($I_{p1}^2$×$R_{p1}$×$t_{on}$)+($I_{p2}^1$×$R_{p2}$×$t_{off}$) ≤Value_ref..." should read --... Σ($I_{p1}^2$×$R_{p1}$×$t_{on}$)+Σ($I_{p2}^2$×$R_{p2}$×$t_{off}$)≤Value_ref...--

Signed and Sealed this
Thirteenth Day of May, 2025

Coke Morgan Stewart
*Acting Director of the United States Patent and Trademark Office*